(12) United States Patent
Adzic et al.

(10) Patent No.: US 7,704,919 B2
(45) Date of Patent: Apr. 27, 2010

(54) ELECTROCATALYSTS HAVING GOLD MONOLAYERS ON PLATINUM NANOPARTICLE CORES, AND USES THEREOF

(75) Inventors: Radoslav Adzic, East Setauket, NY (US); Junliang Zhang, Stony Brook, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1250 days.

(21) Appl. No.: 11/193,694

(22) Filed: Aug. 1, 2005

(65) Prior Publication Data

US 2007/0026292 A1    Feb. 1, 2007

(51) Int. Cl.
*H01M 4/90* (2006.01)
*B01J 23/52* (2006.01)

(52) U.S. Cl. .................... 502/344; 429/40; 502/102; 502/527.15

(58) Field of Classification Search .............. 502/101, 502/182, 185, 527.15, 527.24, 344; 428/403; 427/115; 429/40
See application file for complete search history.

(56) References Cited

U.S. PATENT DOCUMENTS

| | | | |
|---|---|---|---|
| 3,776,776 A | 12/1973 | Petrow | |
| 4,457,986 A | 7/1984 | Bindra et al. | |
| 5,759,944 A | 6/1998 | Buchanan et al. | |
| 6,338,809 B1 | 1/2002 | Hampden-Smith et al. | |
| 6,656,870 B2 | 12/2003 | Christian et al. | |
| 7,205,255 B2 * | 4/2007 | Yamamoto | 502/101 |
| 2002/0012828 A1 * | 1/2002 | Grigorova et al. | 429/40 |
| 2002/0068187 A1 | 6/2002 | O'Connor et al. | |
| 2002/0132154 A1 | 9/2002 | Adzic et al. | |
| 2002/0177143 A1 | 11/2002 | Mirkin et al. | |
| 2003/0039860 A1 * | 2/2003 | Cheon et al. | 428/694 T |
| 2003/0129608 A1 | 7/2003 | Mirkin et al. | |
| 2003/0181321 A1 | 9/2003 | Hampden-Smith et al. | |
| 2004/0038255 A1 * | 2/2004 | Mirkin et al. | 435/6 |
| 2004/0058224 A1 | 3/2004 | Eshraghi et al. | |
| 2004/0115340 A1 | 6/2004 | Griego | |
| 2004/0137312 A1 | 7/2004 | Edlund | |
| 2005/0074612 A1 | 4/2005 | Eklund et al. | |
| 2005/0221148 A1 * | 10/2005 | Goebel | 429/34 |

FOREIGN PATENT DOCUMENTS

WO    WO2006/135396 A2    12/2006

OTHER PUBLICATIONS

Extended European Search Report dated Sep. 23, 2009.

* cited by examiner

*Primary Examiner*—Patrick Ryan
*Assistant Examiner*—Monique Wills
(74) *Attorney, Agent, or Firm*—Dorene M. Price

(57) ABSTRACT

The invention relates to gold-coated particles useful as fuel cell electrocatalysts. The particles are composed of an electrocatalytically active core at least partially encapsulated by an outer shell of gold or gold alloy. The invention more particularly relates to such particles having a noble metal-containing core, and more particularly, a platinum or platinum alloy core. In other embodiments, the invention relates to fuel cells containing these electrocatalysts and methods for generating electrical energy therefrom.

47 Claims, 2 Drawing Sheets

ELECTROCATALYSTS HAVING GOLD MONOLAYERS ON PLATINUM NANOPARTICLE CORES, AND USES THEREOF

The present invention was made with government support under Grant No. DE-AC02-98CH10886 awarded by the U.S. Department of Energy. The United States government has certain rights in the invention.

The present invention relates to gold-coated platinum particles useful as fuel cell electrocatalysts, fuel cells containing these electrocatalysts, and methods for generating electrical energy therefrom.

BACKGROUND OF THE INVENTION

A "fuel cell" is a device which converts chemical energy into electrical energy. In a typical fuel cell, a gaseous fuel, such as hydrogen, is fed to an anode (the negative electrode), while an oxidant, such as oxygen, is fed to a cathode (the positive electrode). Oxidation of the fuel at the anode causes a release of electrons from the fuel into an electrically conducting external circuit which connects the anode and cathode. In turn, the oxidant is reduced at the cathode using the electrons provided by the oxidized fuel.

The electrical circuit is completed by the flow of ions through an electrolyte that allows chemical interaction between the electrodes. The electrolyte is typically in the form of a proton-conducting polymer membrane. The proton-conducting membrane separates the anode and cathode compartments while allowing the flow of protons between them. A well-known example of such a proton-conducting membrane is NAFION®.

A fuel cell, although having components and characteristics similar to those of a typical battery, differs in several respects. A battery is an energy storage device whose available energy is determined by the amount of chemical reactant stored within the battery itself. The battery will cease to produce electrical energy when the stored chemical reactants are consumed. In contrast, the fuel cell is an energy conversion device that theoretically has the capability of producing electrical energy for as long as the fuel and oxidant are supplied to the electrodes.

In a hydrogen/oxygen fuel cell, hydrogen is supplied to the anode and oxygen is supplied to the cathode. Hydrogen molecules are oxidized to form protons while releasing electrons into the external circuit. Oxygen molecules are reduced at the cathode to form reduced oxygen species. Protons travel across the proton-conducting membrane to the cathode compartment to react with reduced oxygen species, thereby forming water. The reactions in a typical hydrogen/oxygen fuel cell are as follows:

Anode: $2H_2 \rightarrow 4H^+ + 4e^-$ (1)

Cathode: $O_2 + 4H+ + 4e^- \rightarrow 2H_2O$ (2)

Net Reaction: $2H_2 + O_2 \rightarrow 2H_2O$ (3)

In many fuel cell systems, a hydrogen fuel is produced by converting a hydrocarbon-based fuel such as methane, or an oxygenated hydrocarbon fuel such as methanol, to hydrogen in a process known as "reforming". The reforming process typically involves the reaction of such fuels with water along with the application of heat. By this reaction, hydrogen is produced. The byproducts of carbon dioxide and carbon monoxide typically accompany the production of hydrogen in the reformation process.

Other fuel cells, known as "direct" or "non-reformed" fuel cells, directly oxidize fuels high in hydrogen content. For example, it has been known for some time that lower primary alcohols, particularly methanol, can be oxidized directly. Due to the advantage of bypassing the reformation step, much effort has gone into the development of so-called "direct methanol oxidation" fuel cells.

In order for the oxidation and reduction reactions in a fuel cell to occur at useful rates and at desired potentials, electrocatalysts are required. Electrocatalysts are catalysts that promote the rates of electrochemical reactions, and thus, allow fuel cells to operate at lower potentials. Accordingly, in the absence of an electrocatalyst, a typical electrode reaction would occur, if at all, only at very high potentials. Due to the high catalytic nature of platinum, platinum and its alloys are preferred as electrocatalysts in the anodes and cathodes of fuel cells.

However, a significant obstacle in commercializing fuel cells is the lack of stability of platinum electrocatalysts in the cathode during operation of the fuel cell. Typically, during operation of a fuel cell, the cathode potential will vary between approximately 0.5 and 1.1 V. This cathode potential variation is often caused by the fluctuating power requirements of a device powered by the fuel cell. For example, an automobile operated by a fuel cell requires stopping and starting.

During the higher cathode potentials, circa one volt, a portion of the platinum electrocatalyst has a tendency to oxidize, thereby causing the concomitant dissolution of platinum ions. The platinum ions are able to migrate at least as far as the proton conducting membrane. Hydrogen crossing through the proton conducting membrane from the anode causes the subsequent reduction of the platinum ions into platinum nanoparticles.

Accordingly, platinum is depleted from the cathode while the build up of platinum on the proton conducting membrane impedes the transport of hydrogen to the cathode. These effects cause a decline in the fuel cell's efficiency.

Another problem in existing electrocatalyst technology is the high platinum loading in fuel cell cathodes. Since platinum is a high-cost precious metal, high platinum loading translates to high costs of manufacture. Accordingly, there have been efforts to reduce the amount of platinum in electrocatalysts.

Platinum nanoparticles have been studied as electrocatalysts. See, for example, U.S. Pat. No. 6,007,934 to Auer et al.; and U.S. Pat. No. 4,031,292 to Hervert.

Platinum-palladium alloy nanoparticles have also been studied. See, for example, U.S. Pat. No. 6,232,264; Solla-Gullon, J., et al, "Electrochemical And Electrocatalytic Behaviour Of Platinum-Palladium Nanoparticle Alloys", *Electrochem. Commun.*, 4, 9: 716 (2002); and Holmberg, K., "Surfactant-Templated Nanomaterials Synthesis", *J. Colloid Interface Sci.*, 274: 355 (2004).

Other platinum-alloy compositions have been studied. For example, U.S. Pat. No. 5,759,944 to Buchanan et al. discloses platinum-nickel and platinum-nickel-gold electrocatalyst compositions.

None of the art discussed above discloses platinum or other noble metal electrocatalysts resistant to the oxidation and dissolution effects of fuel cells. Yet, there is a need for new electrocatalysts having such resistance, especially since such electrocatalysts would further the commercialization of fuel cells. The present invention relates to such electrocatalysts.

SUMMARY OF THE INVENTION

In one embodiment, the invention relates to particles having a core of a suitable noble metal or metal alloy (e.g., platinum) at least partially encapsulated by an outer shell of gold. These gold-coated particles are useful, inter alia, as oxygen-reduction electrocatalyst in fuel cells.

Preferably, the gold outer shell is atomically thin, e.g., an atomic submonolayer, monolayer, bilayer, trilayer, or combination thereof, of gold atoms.

In one embodiment, the outer shell is composed solely of gold. In another embodiment, the outer shell is composed of gold in the presence of one or more alloying metals.

In a particularly preferred embodiment, an atomic submonolayer of gold atoms includes an atomic submonolayer of one or more alloying metals to form a gold alloy monolayer. The one or more alloying metals are preferably transition metals. More preferably, the one or more alloying metals in the gold outer shell are selected from palladium (Pd), platinum (Pt), ruthenium (Ru), rhenium (Re), rhodium (Rh), iridium (Ir), and osmium (Os).

The core is composed of any metal, or combination of metals, which have oxygen-reducing electrocatalytic activity. More preferably, the core is composed of one or more transition metals having oxygen-reducing electrocatalytic activity. More preferably, the core is composed of one or a combination of metals having noble character, particularly those selected from platinum, palladium, gold, rhenium, rhodium, iridium, ruthenium, and osmium.

In one embodiment, the core is composed of a single suitable metal. For example, the core can be composed of platinum, palladium, gold, rhenium, rhodium; iridium, ruthenium, or osmium.

In another embodiment, the core includes a metal alloy composition. For example, the core can include an alloy composed of two or more metals of noble character, e.g., platinum, palladium, gold, rhenium, rhodium, iridium, ruthenium, and osmium. The core can also include an alloy composed of one or more metals of noble character in combination with one or more metals selected from the first row transition metals. More preferably, the one or more first row transition metals are selected from nickel (Ni), cobalt (Co), iron (Fe), and copper (Cu); and even more preferably, from nickel, cobalt, and iron.

In one embodiment, such an alloy core is homogeneous. In a homogeneous core, the one or more alloying metals are distributed uniformly throughout the core on a molecular level.

In another embodiment, such an alloy core is heterogeneous. In a preferred embodiment, a heterogeneous core includes an inner subcore which is at least partially encapsulated by an outer subshell. The composition of the inner subcore is different than the composition of the outer subshell. The outer subshell is bonded to the outer shell of gold or gold alloy. Any number of additional subshells can reside between the inner subcore and the outer subshell.

In one embodiment, an inner subcore and an outer subshell are each independently composed of one or more metals selected from platinum, palladium, gold, rhenium, rhodium, iridium, ruthenium, and osmium. For example, the core can include a platinum subcore encapsulated by a palladium, rhenium, rhodium, iridium, or ruthenium outer subshell; a palladium subcore encapsulated by a platinum, rhenium, rhodium, iridium, or ruthenium outer subshell; a gold subcore encapsulated by a platinum, palladium, rhenium, rhodium, iridium, or ruthenium outer subshell; and so on.

In another embodiment, an inner subcore is composed of one or more metals selected from the first row of transition metals, and more preferably, from iron, cobalt, nickel, and copper. This inner subcore is at least partially encapsulated by an outer subshell composed of one or more metals having noble character, and more preferably, from one or more metals selected from platinum, palladium, gold, rhenium, rhodium, iridium, ruthenium, and osmium.

In a preferred embodiment, an outer subshell in such a heterogeneous core is atomically thin. For example, the outer subshell can be an atomic submonolayer, monolayer, bilayer, trilayer, or a combination thereof.

When applied as fuel cell electrocatalysts, the gold-coated particles are preferably nanoparticles. Preferably, the nanoparticles have a minimum size of about 3 nanometers and a maximum size of about 10 nanometers. The nanoparticles most preferably have a size of about 5 nanometers.

The particles can be in any suitable form. For example, the particles can be in the form of a powder, or alternatively, in the form of a suspension or dispersion in a liquid phase.

In another embodiment, the invention is directed to a catalyst composition which includes the gold-coated particles described above. In a preferred embodiment, the gold-coated particles of the catalyst are bound to a support. In other embodiments, the gold-coated particles of the catalyst are not bound to a support.

The support can be any suitable support. For example, the support can be carbon-based, alumina, silica, silica-alumina, titania, zirconia, calcium carbonate, barium sulphate, a zeolite, interstitial clay, and the like.

Another embodiment is directed to electrocatalyst compositions. In the electrocatalyst compositions, the gold-coated particles are preferably bound to an electrically conductive support. In a further embodiment, the electrocatalyst is on a suitable electrode, e.g., an oxygen-reducing cathode.

Some preferred electrically conductive supports include any electrically conductive carbon-based support, e.g., carbon black, graphitized carbon, graphite, and activated carbon.

In another embodiment, the invention relates to a method for reducing oxygen gas. In one embodiment, the method uses the particles described above on a suitable electrode to reduce oxygen gas. The particles can be unsupported or bound to a support when reducing oxygen gas.

In another embodiment, the invention relates to a fuel cell. In the fuel cell, the oxygen-reducing cathode contains the gold-coated particles bound to an electrically conductive support. The fuel cell contains the other elements typical of a fuel cell, e.g., an anode, an ion-conducting electrolyte, and an electrical contact between the anode and cathode. The ion-conducting electrolyte is more preferably a proton-conducting electrolyte, and even more preferably a solid proton-conducting electrolyte, such as a proton-conducting membrane.

In a method for generating electrical energy, the oxygen-reducing cathode of the fuel cell is contacted with an oxidant, such as oxygen, while the anode of the fuel cell is contacted with a fuel source. Some contemplated fuel sources include, for example, hydrogen gas and alcohols. Some examples of suitable alcohols include methanol and ethanol. Examples of other fuels include methane, gasoline, formic acid, dimethyl ether, and ethylene glycol. The fuels can be unreformed or reformed.

As a result of the present invention, the platinum in fuel cell oxygen-reduction electrocatalysts can be protected from oxidation and dissolution, thereby maintaining the efficiency of such fuel cells. The invention also provides the capability to provide such protection while reducing platinum loadings and increasing oxygen-reducing catalytic activities.

DETAILED DESCRIPTION OF THE INVENTION

Figure 1:
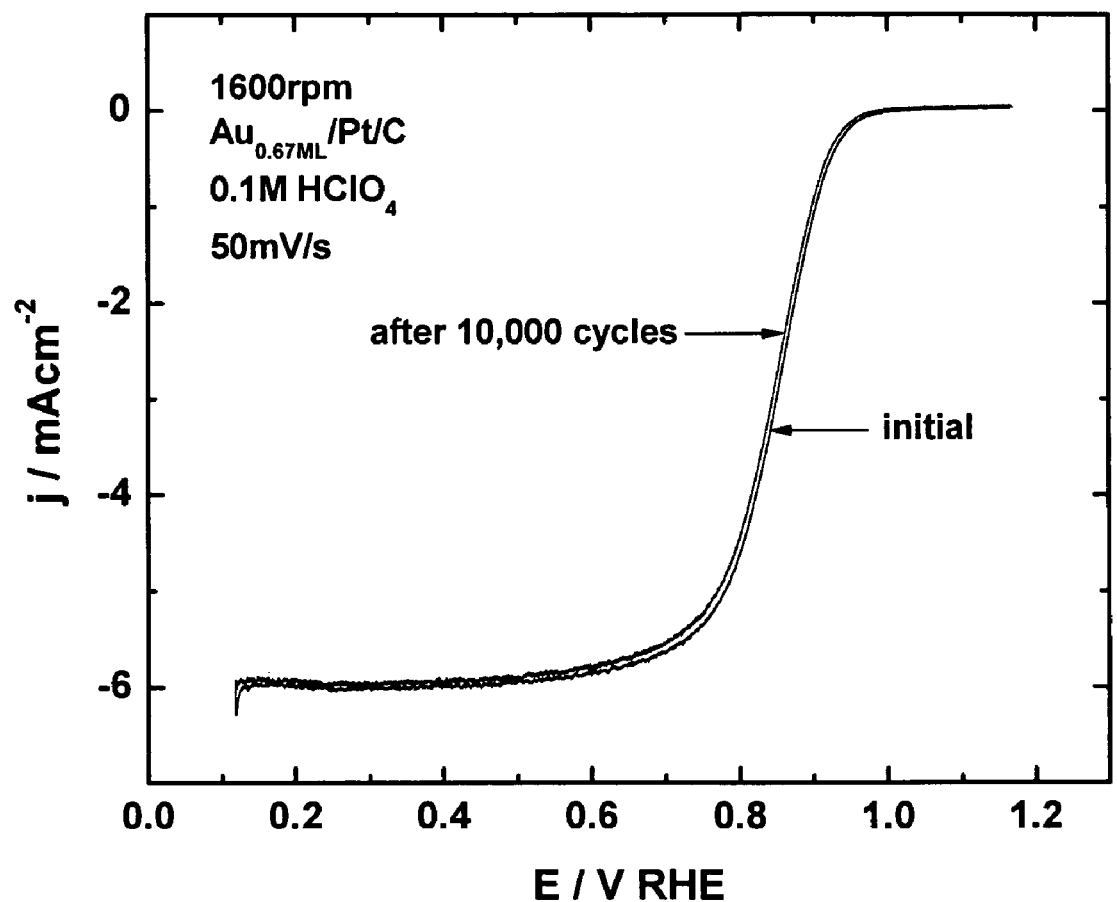
FIG. 1. Comparison of the activity for oxygen reduction of gold-coated platinum particle electrocatalysts on carbon ($Au_{ML}$/Pt/C where ML=monolayer) at 1600 rpm before and after 10,000 cycles from 0.7 to 0.9 volts at a sweep rate of 10 mV/s.

In one aspect, the invention relates to gold-coated particles having oxygen-reducing electrocatalytic activity. The gold-coated particles contain a metal core which is at least partially encapsulated by an outer shell of gold or gold alloy.

In a preferred embodiment, the outer shell of gold covers or encapsulates the entire surface of the metal core. In another embodiment, the outer shell of gold covers a portion of, i.e., partially encapsulates, the metal core. For example, the outer shell of gold can be characterized as interconnected gold islands with some regions of monoatomic, diatomic, or triatomic depth.

Preferably, at least a portion of the gold atoms in the outer shell are in a zerovalent oxidation state while the remaining gold atoms are charged. More preferably, a majority, and even more preferably, all, of the gold atoms are in a zerovalent oxidation state.

The gold outer shell can have any suitable thickness. Preferably, the gold outer shell is atomically thin. Such an atomically thin outer shell of gold can have a thickness of, for example, up to several layers of gold atoms. More preferably, such an atomically thin outer shell is a layer of sub-monoatomic, monoatomic, diatomic, or triatomic thickness, or any combination thereof, of gold atoms.

A gold outer shell of monoatomic thickness, i.e., an atomic monolayer, is a single layer of close-packed gold atoms. An atomic monolayer can be said to have a surface packing parameter of 1.

A gold outer shell of sub-monoatomic coverage, i.e., an atomic submonolayer, is a layer of gold atoms which is less dense than an atomic monolayer (i.e., not close-packed). Accordingly, an atomic submonolayer can be said to have a surface packing parameter of less than 1. For example, a surface packing parameter of 0.5 indicates half the density of gold atoms as compared to a gold atomic monolayer.

A gold outer shell of diatomic thickness is a bilayer (two-atom thick) of gold atoms. Correspondingly, a layer of tri-atomic thickness is a trilayer (three-atom thick) of gold atoms.

In one embodiment, the outer shell is composed solely of gold, e.g., gold in the absence of one or more alloying metals. For example, an atomic submonolayer, monolayer, bilayer, trilayer, or thicker layer of gold can be composed solely of gold atoms.

In another embodiment, the outer shell is composed of gold in the presence of one or more alloying metals. For example, the outer shell can be an atomic submonolayer, monolayer, bilayer, trilayer, or thicker layer, composed of gold and one or more other alloying metals.

In a preferred embodiment, a gold alloy monolayer is composed of a submonolayer of gold in combination with a sub-monolayer of one or more other suitable metals. The one or more other metals (i.e., alloying metals) in such a gold alloy monolayer are preferably resistant to the oxidizing potentials and corrosive environment of a fuel cell. The alloying metals can be selected from, for example, the main group, transition, and rare earth (i.e., lanthanide and actinide) classes of metals. The oxidized forms of the alloying metals are also applicable.

Preferably, the one or more alloying metals in a gold alloy outer shell are selected from the second row (4d) and third row (5d) transition metals. More preferably, the one or more alloying metals are transition metals having noble character, and more preferably, one or more metals selected from palladium (Pd), platinum (Pt), rhodium (Rh), iridium (Ir), ruthenium (Ru), osmium (Os), rhenium (Re), silver (Ag), and cadmium (Cd). Even more preferably, the one or more alloying metals are selected from palladium, platinum, rhodium, iridium, ruthenium, osmium, and rhenium.

A gold alloy outer shell can have any suitable molar composition. For example, a gold alloy outer shell can be a binary alloy according to the formula $M_xAu_{1-x}$ (1), wherein M is any one or combination of suitable alloying metals described above.

In formula (1), the value of x is any suitable value less than 1. For example, in one embodiment, x has a minimum value of about 0.01, 0.05, 0.1, or 0.2. In another embodiment, x has a maximum value of about 0.99, 0.9, 0.8, 0.7, 0.6, 0.5, 0.4, or 0.3. In another embodiment, x is within a suitable range, and preferably, in a range derived from the maximum and minimum values provided.

Some classes of gold binary alloy compositions suitable for the gold outer shell can be represented by the formulas $Pd_xAu_{1-x}$, $Pt_xAu_{1-x}$, $Re_xAu_{1-x}$, $Rh_xAu_{1-x}$, $Ir_xAu_{1-x}$, $Ru_xAu_{1-x}$, and $Os_xAu_{1-x}$, wherein x is as defined above. Some specific examples of gold binary alloy compositions include $Pd_{0.01}Au_{0.99}$, $Pd_{0.1}Au_{0.9}$, $Pd_{0.2}Au_{0.8}$, $Pd_{0.3}Au_{0.7}$, $Pd_{0.4}Au_{0.6}$, $Pd_{0.5}Au_{0.5}$, $Pd_{0.6}Au_{0.4}$, $Pd_{0.7}Au_{0.3}$, $Pd_{0.8}Au_{0.2}$, $Pd_{0.9}Au_{0.1}$, $Pd_{0.95}Au_{0.05}$, $Pt_{0.01}Au_{0.99}$, $Pt_{0.1}Au_{0.9}$, $Pt_{0.2}Au_{0.8}$, $Pt_{0.3}Au_{0.7}$, $Pt_{0.5}Au_{0.5}$, $Pt_{0.7}Au_{0.3}$, $Pt_{0.8}Au_{0.2}$, $Pt_{0.9}Au_{0.1}$, $Pt_{0.95}Au_{0.05}$, $Re_{0.1}Au_{0.9}$, $Re_{0.2}Au_{0.8}$, $Re_{0.3}Au_{0.7}$, $Re_{0.4}Au_{0.6}$, $Re_{0.5}Au_{0.5}$, $Re_{0.6}Au_{0.4}$, $Re_{0.7}Au_{0.3}$, $Re_{0.8}Au_{0.2}$, $Re_{0.9}Au_{0.1}$, $Rh_{0.1}Au_{0.9}$, $Rh_{0.2}Au_{0.8}$, $Rh_{0.3}Au_{0.7}$, $Rh_{0.5}Au_{0.5}$, $Rh_{0.7}Au_{0.3}$, $Rh_{0.8}Au_{0.2}$, $Rh_{0.9}Au_{0.1}$, $Ir_{0.1}Au_{0.9}$, $Ir_{0.2}Au_{0.8}$, $Ir_{0.3}Au_{0.7}$, $Ir_{0.5}Au_{0.5}$, $Ir_{0.7}Au_{0.3}$, $Ir_{0.8}Au_{0.2}$, $Ir_{0.9}Au_{0.1}$, $Ru_{0.1}Au_{0.9}$, $Ru_{0.2}Au_{0.8}$, $Ru_{0.3}Au_{0.7}$, $Ru_{0.5}Au_{0.5}$, $Ru_{0.7}Au_{0.3}$, $Ru_{0.8}Au_{0.2}$, $Ru_{0.9}Au_{0.1}$, $Os_{0.2}Au_{0.8}$, $Os_{0.5}Au_{0.5}$, and $Os_{0.8}Au_{0.2}$.

A gold alloy outer shell can additionally be a ternary alloy. Such a ternary alloy can have a composition according to the formula $M_xN_yAu_{1-x-y}$ (2) wherein M and N are independently any of the suitable alloying metals described above, and x and y independently have any suitable value wherein the sum of x and y is less than 1. Preferably, the values of x and y are independently within the range of about 0.01 to 0.99, and more preferably, within the range of about 0.1 to 0.9.

Some classes of gold ternary alloy compositions suitable for the gold outer shell can be represented by the formulas $Pt_xPd_yAu_{1-x-y}$, $Pt_xRe_yAu_{1-x-y}$, $Pt_xRh_yAu_{1-x-y}$, $Pt_xIr_yAu_{1-x-y}$, $Pt_xRu_yAu_{1-x-y}$, $Pt_xOs_yAu_{1-x-y}$, $Pd_xRe_yAu_{1-x-y}$, $Pd_xRh_yAu_{1-x-y}$, $Pd_xIr_yAu_{1-x-y}$, $Pd_xRu_yAu_{1-x-y}$, $Pd_xOs_yAu_{1-x-y}$, $Ir_xRh_yAu_{1-x-y}$, $Ir_xRu_yAu_{1-x-y}$, $Ir_xOs_yAu_{1-x-y}$, $Ir_xRe_yAu_{1-x-y}$, $Rh_xRu_yAu_{1-x-y}$, $Rh_xOs_yAu_{1-x-y}$, $Rh_xRe_yAu_{1-x-y}$, $Os_xRu_yAu_{1-x-y}$, $Re_xRu_yAu_{1-x-y}$, and $Re_xOs_yAu_{1-x-y}$.

The gold alloy outer shell can additionally be a quaternary or higher alloy. A quaternary alloy can have a composition according to the formula $M_xN_yT_zAu_{1-x-y-z}$ (3). In formula (3), M, N, and T are independently any of the suitable alloying metals described above, and x, y, and z are independently any suitable value wherein the sum of x, y, and z is less than 1.

Some classes of gold quaternary alloy compositions suitable for the gold outer shell can be represented by the formulas $Pt_xPd_yRe_zAu_{1-x-y-z}$, $Pt_xRh_yRe_zAu_{1-x-y-z}$, $Pt_xIr_yRe_zAu_{1-x-y-z}$, $Pt_xRu_yRe_zAu_{1-x-y-z}$, $Pt_xOs_yRe_zAu_{1-x-y-z}$, $Pd_xRh_yRe_zAu_{1-x-y-z}$, $Pd_xIr_yRe_zAu_{1-x-y-z}$, $Pd_xRu_yRe_zAu_{1-x-y-z}$, $Pd_xOs_yRe_zAu_{1-x-y-z}$, $Ir_xRh_yRe_zAu_{1-x-y-z}$, $Ir_xRu_yRe_zAu_{1-x-y-z}$, $Ir_xOs_yRe_zAu_{1-x-y-z}$, $Rh_xRu_yRe_zAu_{1-x-y-z}$, $Rh_xOs_yRe_zAu_{1-x-y-z}$, $Os_xRu_yRe_zAu_{1-x-y-z}$, $Pt_xPd_yRh_zAu_{1-x-y-z}$, $Pt_xPd_yIr_zAu_{1-x-y-z}$, $Pd_xRh_yIr_zAu_{1-x-y-z}$, $Pd_xIr_yRu_zAu_{1-x-y-z}$, $Pd_xRh_yRu_zAu_{1-x-y-z}$, and $Rh_xIr_yRu_zAu_{1-x-y-z}$.

The one or more alloying metals in the gold outer shell can provide certain advantages, such as enhancing or modifying catalytic activity. For example, some metals, particularly some of the transition metals (e.g., Rh, Ir, Ru, and Re) have the ability to adsorb hydroxyl groups (OH). Hydroxyl groups are known to inhibit the oxygen-reducing catalytic activity of platinum.

Such hydroxyl-adsorbing metals, when present in the outer shell, tend to be converted to the corresponding oxide when subjected to the typical oxidizing potentials of a fuel cell in operation. For example, the outer shell can include an oxide of rhenium, rhodium, ruthenium, iridium, tantalum, niobium, titanium, zirconium, molybdenum, or combinations thereof. The oxide of these metals can be designated as, for example, $ReO_v$, $RhO_v$, $RuO_v$, $IrO_v$, $TaO_v$, $NbO_v$, $TiO_v$, $ZrO_v$, $MoO_v$, or $OsO_v$, wherein the subscript v is a suitable generic or specific number of stoichiometric or non-stoichiometric proportion.

The core of the gold-coated particles is composed of one or more metals having oxygen-reducing electrocatalytic activity. More preferably, the core is composed of one or more transition metals having such activity.

Even more preferably, the core is a noble metal-containing core. Such a core contains one or more metals having noble character (i.e., the noble metals). Some examples of metals having noble character include palladium, platinum, rhodium, iridium, ruthenium, osmium, rhenium, silver, and cadmium.

The core can be composed solely of one or more noble metals. Alternatively, the core can include one or more noble metals in a fractional amount of the total composition of the core. For example, the core can be composed of one or more noble metals in combination with one or more non-noble metals.

Preferably, at least a majority of the metal atoms in the core are in a zerovalent oxidation state. In some embodiments, some portion, preferably a minute portion, of the core atoms are in an oxidized state.

Some examples of particularly preferred metals for the core include palladium, platinum, rhodium, iridium, ruthenium, osmium, rhenium, and combinations thereof. Gold can be present in the core only in combination with one or more other metals. For example, gold can be in the core as an alloy, e.g., a binary, ternary, quaternary, or higher alloy.

In one embodiment, the core is composed of a single suitable metal, preferably a noble metal. For example, the core can be composed of either platinum, palladium, rhenium, rhodium, iridium, ruthenium, or osmium.

In another embodiment, the core is composed of an alloy, i.e., a combination of two or more metals. Preferably, at least one of the metals has noble character. The alloy composition of the core can be a binary, ternary, quaternary, or higher alloy composition.

Such an alloy core can, for example, be composed of two or more noble metals. The noble metals are preferably selected from platinum, palladium, gold, rhenium, rhodium, iridium, ruthenium, and osmium. The noble metal alloy can be a binary, ternary, quaternary, or higher alloy.

The amount of each noble metal in such a noble metal alloy core can be any suitable amount. For example, the noble metals can be in a minimum amount of approximately 0.1, 0.5, 1, 5, 10, 20, 30, or 40 molar percent, or in a maximum amount of approximately 50, 60, 70, 80, 90, 95, 99, 99.5, or 99.8 molar percent. The amount of each metal can be in any suitable range, and particularly, any suitable range resulting from a combination of the minimum and maximum molar percents described.

Binary and higher alloy compositions having two or more noble metals can be represented by the formula $M^1_xM^2_{1-x}$, wherein $M^1$ and $M^2$ each independently represent one or a combination of noble metals. More preferably, $M^1$ and $M^2$ each represent one or a combination of noble metals selected from platinum, palladium, gold, rhenium, rhodium, iridium, ruthenium, and osmium. The subscript x is any suitable value, and more preferably, any suitable value in the range of 0.01 to 0.99.

Some more specific examples of binary and higher noble metal alloy compositions suitable for the core include those having approximate molar compositions $M^1_{0.01}M^2_{0.99}$, $M^1_{0.05}M^2_{0.95}$, $M^1_{0.1}M^2_{0.9}$, $M^1_{0.2}M^2_{0.8}$, $M^1_{0.3}M^2_{0.7}$, $M^1_{0.33}M^2_{0.67}$, (i.e., $M^1M^2_2$), $M^1_{0.4}M^2_{0.6}$, $M^1_{0.5}M^2_{0.5}$ (i.e., $M^1M^2$), $M^1_{0.6}M^2_{0.4}$, $M^1_{0.66}M^2_{0.33}$ (i.e., $M^1_2M^2$), $M^1_{0.7}M^2_{0.3}$, $M^1_{0.75}M^2_{0.25}$ (i.e., $M^1_3M^2$), $M^1_{0.8}M^2_{0.2}$ (i.e., $M^1_4M^2$), $M^1_{0.9}M^2_{0.1}$, $M^1_{0.95}M^2_{0.05}$, and $M^1_{0.99}M^2_{0.01}$, wherein $M^1$ and $M^2$ represent one or a combination of metals selected from the noble metals, and more preferably, platinum, palladium, gold, rhenium, rhodium, iridium, ruthenium, and osmium.

Some examples of classes of binary noble metal alloy compositions suitable for the core include the platinum-palladium, platinum-rhenium, platinum-rhodium, platinum-ruthenium, platinum-iridium, platinum-osmium, platinum-gold, palladium-rhenium, palladium-rhodium, palladium-ruthenium, palladium-iridium, palladium-osmium, palladium-gold, rhenium-ruthenium, rhenium-rhodium, rhenium-osmium, rhenium-iridium, rhenium-gold, rhodium-iridium, rhodium-ruthenium, rhodium-osmium, rhodium-gold, ruthenium-iridium, gold-ruthenium, gold-osmium, osmium-iridium, and osmium-ruthenium compositions.

Some specific examples of platinum-palladium binary alloy compositions suitable for the core include the approximate molar compositions $Pt_{0.2}Pd_{0.8}$, $Pt_{0.3}Pd_{0.7}$, $Pt_{0.33}Pd_{0.67}$ (i.e., $PtPd_2$), $Pt_{0.4}Pd_{0.6}$, $Pt_{0.5}Pd_{0.5}$ (i.e., $PtPd$), $Pt_{0.6}Pd_{0.4}$, $Pt_{0.66}Pd_{0.33}$ (i.e., $Pt_2Pd$), $Pt_{0.7}Pd_{0.3}$, $Pt_{0.75}Pd_{0.25}$ (i.e., $Pt_3Pd$), and $Pt_{0.8}Pd_{0.2}$ (i.e., $Pt_4Pd$).

Some specific examples of platinum-rhenium binary alloy compositions suitable for the core include the approximate molar compositions $Pt_{0.2}Re_{0.8}$, $Pt_{0.3}Re_{0.7}$, $Pt_{0.33}Re_{0.67}$ (i.e., $PtRe_2$), $Pt_{0.4}Re_{0.6}$, $Pt_{0.5}Re_{0.5}$ (i.e., $PtRe$), $Pt_{0.6}Re_{0.4}$, $Pt_{0.66}Re_{0.33}$ (i.e., $Pt_2Re$) $Pt_{0.7}Re_{0.3}$, $Pt_{0.75}Re_{0.25}$ (i.e., $Pt_3Re$), and $Pt_{0.8}Re_{0.2}$ (i.e., $Pt_4Re$).

Some specific examples of platinum-rhodium binary alloy compositions suitable for the core include the approximate molar compositions $Pt_{0.2}Rh_{0.8}$, $Pt_{0.3}Rh_{0.7}$, $Pt_{0.33}Rh_{0.67}$ (i.e., $PtRh_2$), $Pt_{0.4}Rh_{0.6}$, $Pt_{0.5}Rh_{0.5}$ (i.e., $PtRh$), $Pt_{0.6}Rh_{0.4}$, $Pt_{0.66}Rh_{0.33}$ (i.e., $Pt_2Rh$), $Pt_{0.7}Rh_{0.3}$, $Pt_{0.75}Rh_{0.25}$ (i.e., $Pt_3Rh$), and $Pt_{0.8}Rh_{0.2}$ (i.e., $Pt_4Rh$).

Some specific examples of platinum-iridium binary alloy compositions suitable for the core include the approximate molar compositions $Pt_{0.2}Ir_{0.8}$, $Pt_{0.3}Ir_{0.7}$, $Pt_{0.33}Ir_{0.67}$ (i.e., $PtIr_2$), $Pt_{0.4}Ir_{0.6}$, $Pt_{0.5}Ir_{0.5}$ (i.e., $PtIr$), $Pt_{0.6}Ir_{0.4}$, $Pt_{0.66}Ir_{0.33}$ (i.e., $Pt_2Ir$), $Pt_{0.7}Ir_{0.3}$, $Pt_{0.75}Ir_{0.25}$ (i.e., $Pt_3Ir$), and $Pt_{0.8}Ir_{0.2}$ (i.e., $Pt_4Ir$).

Some specific examples of platinum-ruthenium binary alloy compositions suitable for the core include the approximate molar compositions $Pt_{0.2}Ru_{0.8}$, $Pt_{0.3}Ru_{0.7}$, $Pt_{0.33}Ru_{0.67}$ (i.e., $PtRu_2$), $Pt_{0.4}Ru_{0.6}$, $Pt_{0.5}Ru_{0.5}$ (i.e., $PtRu$), $Pt_{0.6}Ru_{0.4}$, $Pt_{0.66}Ru_{0.33}$ (i.e., $Pt_2Ru$), $Pt_{0.7}Ru_{0.3}$, $Pt_{0.75}Ru_{0.25}$ (i.e., $Pt_3Ru$), and $Pt_{0.8}Ru_{0.2}$ (i.e., $Pt_4Ru$).

Some specific examples of platinum-gold binary alloy compositions suitable for the core include the approximate molar compositions $Pt_{0.2}Au_{0.8}$, $Pt_{0.3}Au_{0.7}$, $Pt_{0.33}Au_{0.67}$ (i.e., $PtAu_2$), $Pt_{0.4}Au_{0.6}$, $Pt_{0.5}Au_{0.5}$ (i.e., $PtAu$), $Pt_{0.6}Au_{0.4}$, $Pt_{0.66}Au_{0.33}$ (i.e., $Pt_2Au$), $Pt_{0.7}Au_{0.3}$, $Pt_{0.75}Au_{0.25}$ (i.e., $Pt_3Au$), and $Pt_{0.8}Au_{0.2}$ (i.e., $Pt_4Au$).

Some specific examples of palladium-rhenium binary alloy compositions suitable for the core include the approximate molar compositions $Pd_{0.2}Re_{0.8}$, $Pd_{0.3}Re_{0.7}$, $Pd_{0.33}Re_{0.67}$ (i.e., $PdRe_2$), $Pd_{0.4}Re_{0.6}$, $Pd_{0.5}Re_{0.5}$ (i.e., $PdRe$), $Pd_{0.6}Re_{0.4}$, $Pd_{0.66}Re_{0.33}$ (i.e., $Pd_2Re$), $Pd_{0.7}Re_{0.3}$, $Pd_{0.75}Re_{0.25}$ (i.e., $Pd_3Re$), and $Pd_{0.8}Re_{0.2}$ (i.e., $Pd_4Re$).

Some specific examples of palladium-rhodium binary alloy compositions suitable for the core include the approximate molar compositions $Pd_{0.2}Rh_{0.8}$, $Pd_{0.3}Rh_{0.7}$, $Pd_{0.33}Rh_{0.67}$ (i.e., $PdRh_2$), $Pd_{0.4}Rh_{0.6}$, $Pd_{0.5}Rh_{0.5}$ (i.e., $PdRh$), $Pd_{0.6}Rh_{0.4}$, $Pd_{0.66}Rh_{0.33}$ (i.e., $Pd_2Rh$), $Pd_{0.7}Rh_{0.3}$, $Pd_{0.75}Rh_{0.25}$ (i.e., $Pd_3Rh$), and $Pd_{0.8}Rh_{0.2}$ (i.e., $Pd_4Rh$).

Some specific examples of palladium-iridium binary alloy compositions suitable for the core include the approximate molar compositions $Pd_{0.2}Ir_{0.8}$, $Pd_{0.3}Ir_{0.7}$, $Pd_{0.33}Ir_{0.67}$ (i.e., $PdIr_2$), $Pd_{0.4}Ir_{0.6}$, $Pd_{0.5}Ir_{0.5}$ (i.e., $PdIr$), $Pd_{0.6}Ir_{0.4}$, $Pd_{0.66}Ir_{0.33}$ (i.e., $Pd_2Ir$), $Pd_{0.7}Ir_{0.3}$, $Pd_{0.75}Ir_{0.25}$ (i.e., $Pd_3Ir$), and $Pd_{0.8}Ir_{0.2}$ (i.e., $Pd_4Ir$).

Some specific examples of palladium-ruthenium binary alloy compositions suitable for the core include the approximate molar compositions $Pd_{0.2}Ru_{0.8}$, $Pd_{0.3}Ru_{0.7}$, $Pd_{0.33}Ru_{0.67}$ (i.e., $PdRu_2$), $Pd_{0.4}Ru_{0.6}$, $Pd_{0.5}Ru_{0.5}$ (i.e., $PdRu$), $Pd_{0.6}Ru_{0.4}$, $Pd_{0.66}Ru_{0.33}$ (i.e., $Pd_2Ru$), $Pd_{0.7}Ru_{0.3}$, $Pd_{0.75}Ru_{0.25}$ (i.e., $Pd_3Ru$), and $Pd_{0.8}Ru_{0.2}$ (i.e., $Pd_4Ru$).

Some specific examples of palladium-gold binary alloy compositions suitable for the core include the approximate molar compositions $Pd_{0.2}Au_{0.8}$, $Pd_{0.3}Au_{0.7}$, $Pd_{0.33}Au_{0.67}$ (i.e., $PdAu_2$), $Pd_{0.4}Au_{0.6}$, $Pd_{0.5}Au_{0.5}$ (i.e., $PdAu$), $Pd_{0.6}Au_{0.4}$, $Pd_{0.66}Au_{0.33}$ (i.e., $Pd_2Au$), $Pd_{0.7}Au_{0.3}$, $Pd_{0.75}Au_{0.25}$ (i.e., $Pd_3Au$), and $Pd_{0.8}Au_{0.2}$ (i.e., $Pd_4Au$).

Some specific examples of rhenium-rhodium binary alloy compositions suitable for the core include the approximate molar compositions $Re_{0.2}Rh_{0.8}$, $Re_{0.3}Rh_{0.7}$, $Re_{0.33}Rh_{0.67}$ (i.e., $ReRh_2$), $Re_{0.4}Rh_{0.6}$, $Re_{0.5}Rh_{0.5}$ (i.e., $ReRh$), $Re_{0.6}Rh_{0.4}$, $Re_{0.66}Rh_{0.33}$ (i.e., $Re_2Rh$), $Re_{0.7}Rh_{0.3}$, $Re_{0.75}Rh_{0.25}$ (i.e., $Re_3Rh$), and $Re_{0.8}Rh_{0.2}$ (i.e., $Re_4Rh$).

Some specific examples of rhenium-iridium binary alloy compositions suitable for the core include the approximate molar compositions $Re_{0.2}Ir_{0.8}$, $Re_{0.3}Ir_{0.7}$, $Re_{0.33}Ir_{0.67}$ (i.e., $ReIr_2$), $Re_{0.4}Ir_{0.6}$, $Re_{0.5}Ir_{0.5}$ (i.e., $ReIr$), $Re_{0.6}Ir_{0.4}$, $Re_{0.66}Ir_{0.33}$ (i.e., $Re_2Ir$), $Re_{0.7}Ir_{0.3}$, $Re_{0.75}Ir_{0.25}$ (i.e., $Re_3Ir$), and $Re_{0.8}Ir_{0.2}$ (i.e., $Re_4Ir$).

Some specific examples of rhenium-ruthenium binary alloy compositions suitable for the core include the approximate molar compositions $Re_{0.2}Ru_{0.8}$, $Re_{0.3}Ru_{0.7}$, $Re_{0.33}Ru_{0.67}$ (i.e., $ReRu_2$), $Re_{0.4}Ru_{0.6}$, $Re_{0.5}Ru_{0.5}$ (i.e., $ReRu$), $Re_{0.6}Ru_{0.4}$, $Re_{0.66}Ru_{0.33}$ (i.e., $Re_2Ru$), $Re_{0.7}Ru_{0.3}$, $Re_{0.75}Ru_{0.25}$ (i.e., $Re_3Ru$), and $Re_{0.8}Ru_{0.2}$ (i.e., $Re_4Ru$).

Some specific examples of rhenium-gold binary alloy compositions suitable for the core include the approximate molar compositions $Re_{0.2}Au_{0.8}$, $Re_{0.3}Au_{0.7}$, $Re_{0.33}Au_{0.67}$ (i.e., $ReAu_2$), $Re_{0.4}Au_{0.6}$, $Re_{0.5}Au_{0.5}$ (i.e., $ReAu$), $Re_{0.6}Au_{0.4}$, $Re_{0.66}Au_{0.33}$ (i.e., $Re_2Au$), $Re_{0.7}Au_{0.3}$, $Re_{0.75}Au_{0.25}$ (i.e., $Re_3Au$), and $Re_{0.8}Au_{0.2}$ (i.e., $Re_4Au$).

Some specific examples of rhodium-iridium binary alloy compositions suitable for the core include the approximate molar compositions $Rh_{0.2}Ir_{0.8}$, $Rh_{0.3}Ir_{0.7}$, $Rh_{0.33}Ir_{0.67}$ (i.e., $RhIr_2$), $Rh_{0.4}Ir_{0.6}$, $Rh_{0.5}Ir_{0.5}$ (i.e., $RhIr$), $Rh_{0.6}Ir_{0.4}$, $Rh_{0.66}Ir_{0.33}$ (i.e., $Rh_2Ir$), $Rh_{0.7}Ir_{0.3}$, $Rh_{0.75}Ir_{0.25}$ (i.e., $Rh_3Ir$), and $Rh_{0.8}Ir_{0.2}$ (i.e., $Rh_4Ir$).

Some specific examples of rhodium-ruthenium binary alloy compositions suitable for the core include the approximate molar compositions $Rh_{0.2}Ru_{0.8}$, $Rh_{0.3}Ru_{0.7}$, $Rh_{0.33}Ru_{0.67}$ (i.e., $RhRu_2$), $Rh_{0.4}Ru_{0.6}$, $Rh_{0.5}Ru_{0.5}$ (i.e., $RhRu$), $Rh_{0.6}Ru_{0.4}$, $Rh_{0.66}Ru_{0.33}$ (i.e., $Rh_2Ru$), $Rh_{0.7}Ru_{0.3}$, $Rh_{0.75}Ru_{0.25}$ (i.e., $Rh_3Ru$), and $Rh_{0.8}Ru_{0.2}$ (i.e., $Rh_4Ru$).

Some specific examples of rhodium-gold binary alloy compositions suitable for the core include the approximate molar compositions $Rh_{0.2}Au_{0.8}$, $Rh_{0.3}Au_{0.7}$, $Rh_{0.33}Au_{0.67}$ (i.e., $RhAu_2$), $Rh_{0.4}Au_{0.6}$, $Rh_{0.5}Au_{0.5}$ (i.e., $RhAu$), $Rh_{0.6}Au_{0.4}$, $Rh_{0.66}Au_{0.33}$ (i.e., $Rh_2Au$), $Rh_{0.7}Au_{0.3}$, $Rh_{0.75}Au_{0.25}$ (i.e., $Rh_3Au$), and $Rh_{0.8}Au_{0.2}$ (i.e., $Rh_4Au$).

Some specific examples of iridium-ruthenium binary alloy compositions suitable for the core include the approximate molar compositions $Ir_{0.2}Ru_{0.8}$, $Ir_{0.3}Ru_{0.7}$, $Ir_{0.33}Ru_{0.67}$ (i.e., $IrRu_2$), $Ir_{0.4}Ru_{0.6}$, $Ir_{0.5}Ru_{0.5}$ (i.e., $IrRu$), $Ir_{0.6}Ru_{0.4}$, $Ir_{0.66}Ru_{0.33}$ (i.e., $Ir_2Ru$), $Ir_{0.7}Ru_{0.3}$, $Ir_{0.75}Ru_{0.25}$ (i.e., $Ir_3Ru$), and $Ir_{0.8}Ru_{0.2}$ (i.e., $Ir_4Ru$).

Some specific examples of iridium-gold binary alloy compositions suitable for the core include the approximate molar compositions $Ir_{0.2}Au_{0.8}$, $Ir_{0.3}Au_{0.7}$, $Ir_{0.33}Au_{0.67}$ (i.e., $IrAu_2$), $Ir_{0.4}Au_{0.6}$, $Ir_{0.5}Au_{0.5}$ (i.e., $IrAu$), $Ir_{0.6}Au_{0.4}$, $Ir_{0.66}Au_{0.33}$ (i.e., $Ir_2Au$), $Ir_{0.7}Au_{0.3}$, $Ir_{0.75}Au_{0.25}$ (i.e., $Ir_3Au$), and $Ir_{0.8}Au_{0.2}$ (i.e., $Ir_4Au$).

Some specific examples of gold-ruthenium binary alloy compositions suitable for the core include the approximate molar compositions $Au_{0.2}Ru_{0.8}$, $Au_{0.3}Ru_{0.7}$, $Au_{0.33}Ru_{0.67}$ (i.e., $AuRu_2$), $Au_{0.4}Ru_{0.6}$, $Au_{0.5}Ru_{0.5}$ (i.e., $AuRu$), $Au_{0.6}Ru_{0.4}$, $Au_{0.66}Ru_{0.33}$ (i.e., $Au_2Ru$), $Au_{0.7}Ru_{0.3}$, $Au_{0.75}Ru_{0.25}$ (i.e., $Au_3Ru$), and $Au_{0.8}Ru_{0.2}$ (i.e., $Au_4Ru$).

Some specific examples of gold-osmium binary alloy compositions suitable for the core include the approximate molar compositions $Au_{0.2}Os_{0.8}$, $Au_{0.3}Os_{0.7}$, $Au_{0.33}Os_{0.67}$ (i.e., $AuOs_2$), $Au_{0.4}Os_{0.6}$, $Au_{0.5}Os_{0.5}$ (i.e., $AuOs$), $Au_{0.6}Os_{0.4}$, $Au_{0.66}Os_{0.33}$ (i.e., $Au_2Os$), $Au_{0.7}Os_{0.3}$, $Au_{0.75}Os_{0.25}$ (i.e., $Au_3Os$), and $Au_{0.8}Os_{0.2}$ (i.e., $Au_4Os$).

Ternary and higher alloy compositions having three or more noble metals can be represented by the formula $M^1_xM^2_yM^3_{1-x-y}$, wherein $M^1$, $M^2$, and $M^3$ each represent one or a combination of noble metals. The subscripts x and y have any suitable value wherein the sum of x and y is less than 1, e.g., in the range 0.01 to 0.99.

Some examples of ternary and higher noble metal alloy compositions suitable for the core include those having approximate molar compositions $M^1_{0.01}M^2_{0.01}M^3_{0.98}$, $M^1_{0.02}M^2_{0.03}M^3_{0.95}$, $M^1_{0.05}M^2_{0.05}M^3_{0.9}$, $M^1_{0.1}M^2_{0.1}M^3_{0.8}$, $M^1_{0.2}M^2_{0.1}M^3_{0.7}$, $M^1_{0.2}M^2_{0.2}M^3_{0.6}$, $M^1_{0.1}M^2_{0.3}M^3_{0.6}$, $M^1_{0.2}M^2_{0.3}M^3_{0.5}$, $M^1_{0.1}M^2_{0.4}M^3_{0.5}$, $M^1_{0.3}M^2_{0.3}M^3_{0.4}$, $M^1_{0.1}M^2_{0.5}M^3_{0.4}$, $M^1_{0.2}M^2_{0.4}M^3_{0.4}$, $M^1_{0.4}M^2_{0.3}M^3_{0.3}$, $M^1_{0.1}M^2_{0.6}M^3_{0.3}$, $M^1_{0.2}M^2_{0.5}M^3_{0.3}$, $M^1_{0.4}M^2_{0.4}M^3_{0.2}$, $M^1_{0.5}M^2_{0.3}M^3_{0.2}$, $M^1_{0.1}M^2_{0.7}M^3_{0.2}$, $M^1_{0.4}M^2_{0.5}M^3_{0.1}$, $M^1_{0.3}M^2_{0.6}M^3_{0.1}$, $M^1_{0.1}M^2_{0.8}M^3_{0.1}$, and $M^1_{0.2}M^3_{0.75}M^3_{0.05}$, wherein $M^1$, $M^2$, and $M^3$ represent one or a combination of metals selected from the noble metals, and more preferably, platinum, palladium, gold, rhenium, rhodium, iridium, ruthenium, and osmium.

Some classes of ternary noble metal alloy compositions suitable for the core include the palladium-gold-rhodium, palladium-rhodium-iridium, palladium-iridium-gold, palladium-ruthenium-rhodium, palladium-rhenium-gold, palladium-rhenium-iridium, palladium-rhenium-rhodium, palladium-rhenium-ruthenium, rhenium-rhodium-gold, rhenium-iridium-gold, rhenium-ruthenium-gold, rhenium-iridiumrhodium, rhenium-rhodium-ruthenium, rhenium-iridium-ruthenium, and rhenium-iridium-osmium compositions.

In another embodiment, an alloy core is composed of one or more noble metals and one or more non-noble metals. The one or more non-noble metals can be selected from, for example, the class of alkali, alkaline earth, transition, main group, and rare earth metals.

Some examples of alkali and alkaline earth metals which can be included in an alloy core include lithium (Li), sodium (Na), potassium (K), beryllium (Be), magnesium (Mg), calcium (Ca), and strontium (Sr).

Some examples of main group metals which can be included in an alloy core include boron (B), aluminum (Al), gallium (Ga), indium (In), carbon (C), silicon (Si), germanium (Ge), nitrogen (N), phosphorus (P), arsenic (As), antimony (Sb), sulfur (S), selenium (Se), and tellurium (Te).

Some examples of rare earth metals which can be included in an alloy core include lanthanum (La), cerium (Ce), neodymium (Nd), samarium (Sm), europium (Eu), gadolinium (Gd), and terbium (Th), thorium (Th), proctactinium (Pa), uranium (U), and americium (Am).

Some examples of classes of transition metals suitable for inclusion in an alloy core include the first row (3d), second row (4d), and third row (5d) transition metals.

The first row (3d) transition metals refer to the row of transition metals starting with scandium (Sc) and ending with zinc (Zn). Some examples of suitable first row transition metals include titanium (Ti), vanadium (V), chromium (Cr), manganese (Mn), iron (Fe), cobalt (Co), nickel (Ni), copper (Cu), and zinc (Zn).

The second row (4d) transition metals refer to the row of transition metals starting with yttrium (Y) and ending with cadmium (Cd). Some examples of suitable second row transition metals include molybdenum (Mo), technetium (Tc), ruthenium (Ru), rhodium (Rh), palladium (Pd), and silver (Ag).

The third row (5d) transition metals refer to the row of transition metals starting with hafnium (Hf) and ending with mercury (Hg). Some examples of suitable third row transition metals include tantalum (Ta), tungsten (W), rhenium (Re), osmium (Os), iridium (Ir), platinum (Pt), and gold (Au).

In a preferred embodiment, an alloy core is composed of one or more noble metals, and more preferably, one or more metals selected from platinum, palladium, gold, rhenium, rhodium, iridium, ruthenium, and osmium, in combination with one or more metals selected from the first row of transition metals. The resulting alloy can be a binary, ternary, quaternary, or higher alloy.

More preferably, the first row transition metals in such an alloy core are selected from nickel, cobalt, iron, and copper, and more preferably, nickel, cobalt, and iron. At least a portion of the first row transition metal atoms are zerovalent.

Binary and higher alloy compositions having one or more noble metals and one or more first row transition metals can be represented by the formula $M^1_x M^4_{1-x}$, wherein $M^1$ represents one or a combination of noble metals and $M^4$ represents one or a combination of first row transition metals. The subscript x is any suitable value as described above.

Some examples of molar compositions of such binary alloys suitable for the core include $M^1_{0.01}M^4_{0.99}$, $M^1_{0.02}M^4_{0.98}$, $M^1_{0.05}M^4_{0.95}$, $M^1_{0.1}M^4_{0.9}$, $M^1_{0.2}M^4_{0.8}$, $M^1_{0.3}M^4_{0.7}$, $M^1_{0.4}M^4_{0.6}$, $M^1_{0.5}M^5_{0.5}$, $M^1_{0.6}M^4_{0.4}$, $M^1_{0.7}M^4_{0.3}$, $M^1_{0.8}M^4_{0.2}$, $M^1_{0.9}M^4_{0.1}$, $M^1_{0.95}M^4_{0.05}$, $M^1_{0.98}M^4_{0.02}$, and $M^1_{0.99}M^4_{0.01}$, wherein $M^1$ represents a noble metal, and more preferably, a metal selected from platinum, palladium, gold, rhenium, rhodium, iridium, ruthenium, and osmium; and $M^4$ represents a first row transition metal, and more preferably, iron, cobalt, nickel, or copper.

Some examples of classes of binary alloy compositions suitable for the core which contain one noble metal and one first row transition metal include the platinum-nickel, platinum-cobalt, platinum-iron, platinum-copper, palladium-nickel, palladium-cobalt, palladium-iron, palladium-copper, gold-nickel, gold-cobalt, gold-iron, gold-copper, rhenium-nickel, rhenium-cobalt, rhenium-iron, rhenium-copper, rhodium-nickel, rhodium-cobalt, rhodium-iron, rhodium-copper, iridium-nickel, iridium-cobalt, iridium-iron, iridium-copper, ruthenium-nickel, ruthenium-cobalt, ruthenium-iron, ruthenium-copper, osmium-nickel, osmium-cobalt, osmium-iron, and osmium-copper compositions.

Some more specific examples of such binary and higher alloy core compositions include the approximate molar compositions $Pt_{0.2}X_{0.8}$, $Pt_{0.33}X_{0.67}$ (i.e., $PtX_2$), $Pt_{0.4}X_{0.6}$, $Pt_{0.5}X_{0.5}$ (i.e., $PtX$), $Pt_{0.67}X_{0.33}$ (i.e., $Pt_2X$), $Pt_{0.75}X_{0.25}$ (i.e., $Pt_3X$), $Pt_{0.8}X_{0.2}$ (i.e., $Pt_4X$), $Pd_{0.2}X_{0.8}$, $Pd_{0.33}X_{0.67}$ (i.e., $PdX_2$), $Pd_{0.4}X_{0.6}$, $Pd_{0.5}X_{0.5}$ (i.e., $PdX$), $Pd_{0.67}X_{0.33}$ (i.e., $Pd_2X$), $Pd_{0.75}X_{0.25}$ (i.e., $Pd_3X$), $Pd_{0.8}X_{0.2}$ (i.e., $Pd_4X$), $Ru_{0.2}X_{0.8}$, $Ru_{0.33}X_{0.67}$ (i.e., $RuX_2$), $Ru_{0.4}X_{0.6}$, $Ru_{0.5}X_{0.5}$ (i.e., $RuX$), $Ru_{0.67}X_{0.33}$ (i.e., $Ru_2X$), $Ru_{0.75}X_{0.25}$ (i.e., $Ru_3X$), $Ru_{0.8}X_{0.2}$ (i.e., $Ru_4X$), $Au_{0.2}X_{0.8}$, $Au_{0.33}X_{0.67}$ (i.e., $AuX_2$), $Au_{0.4}X_{0.6}$, $Au_{0.5}X_{0.5}$ (i.e., $AuX$), $Au_{0.67}X_{0.33}$ (i.e., $Au_2X$), $Au_{0.75}X_{0.25}$ (i.e., $Au_3X$), $Au_{0.8}X_{0.2}$ (i.e., $Au_4X$), $Re_{0.2}X_{0.8}$, $Re_{0.33}X_{0.67}$ (i.e., $ReX_2$), $Re_{0.4}X_{0.6}$, $Re_{0.5}X_{0.5}$ (i.e., $ReX$), $Re_{0.67}X_{0.33}$ (i.e., $Re_2X$), $Re_{0.75}X_{0.25}$ (i.e., $Re_3X$), $Re_{0.8}X_{0.2}$ (i.e., $Re_4X$), $Rh_{0.2}X_{0.8}$, $Rh_{0.33}X_{0.67}$ (i.e., $RhX_2$), $Rh_{0.4}X_{0.6}$, $Rh_{0.5}X_{0.5}$ (i.e., $ReX$), $Rh_{0.67}X_{0.33}$ (i.e., $Rh_2X$), $Rh_{0.75}X_{0.25}$ (i.e., $Rh_3X$), $Rh_{0.8}X_{0.2}$ (i.e., $Rh_4X$), $Ir_{0.2}X_{0.8}$, $Ir_{0.33}X_{0.67}$ (i.e., $IrX_2$), $Ir_{0.4}X_{0.6}$, $Ir_{0.5}X_{0.5}$ (i.e., $IrX$), $Ir_{0.67}X_{0.33}$ (i.e., $Ir_2X$), $Ir_{0.75}X_{0.25}$ (i.e., $Ir_3X$), $Ir_{0.8}X_{0.2}$ (i.e., $Ir_4X$), wherein X represents one or a combination of first row transition metals, and more preferably, one or a combination of nickel, cobalt, iron, and copper.

Ternary and higher alloy compositions having at least one noble metal and at least two first row transition metals can be represented by the formula $M^1_{1-x-y}M^4_xM^5_y$, wherein $M^1$ represents one or a combination of noble metals and $M^4$ and $M^5$ each independently represent one or a combination of first row transition metals. The subscripts x and y are any suitable value as described above.

Some examples of molar compositions of such ternary alloys suitable for the core include $M^1_{0.01}M^4_{0.01}M^5_{0.98}$, $M^1_{0.02}M^4_{0.03}M^5_{0.95}$, $M^1_{0.05}M^4_{0.05}M^5_{0.9}$, $M^1_{0.1}M^4_{0.1}M^5_{0.8}$, $M^1_{0.1}M^4_{0.2}M^5_{0.7}$, $M^1_{0.1}M^4_{0.3}M^5_{0.6}$, $M^1_{0.1}M^4_{0.4}M^5_{0.5}$, $M^1_{0.2}M^4_{0.1}M^5_{0.7}$, $M^1_{0.2}M^4_{0.2}M^5_{0.6}$, $M^1_{0.2}M^4_{0.3}M^5_{0.5}$, $M^1_{0.1}M^4_{0.4}M^5_{0.4}$, $M^1_{0.2}M^4_{0.75}M^5_{0.05}$, $M^1_{0.3}M^4_{0.3}M^5_{0.4}$, $M^1_{0.3}M^4_{0.1}M^5_{0.6}$, $M^1_{0.4}M^4_{0.1}M^5_{0.5}$, $M^1_{0.4}M^4_{0.4}M^5_{0.2}$, $M^1_{0.4}M^4_{0.3}M^5_{0.3}$, $M^1_{0.5}M^4_{0.3}M^5_{0.2}$, $M^1_{0.4}M^4_{0.4}M^5_{0.1}$, $M^1_{0.6}M^4_{0.3}M^5_{0.1}$, $M^1_{0.6}M^4_{0.2}M^5_{0.2}$, $M^1_{0.7}M^4_{0.2}M^5_{0.1}$, $M^1_{0.8}M^4_{0.1}M^5_{0.1}$, $M^1_{0.9}M^4_{0.05}M^5_{0.05}$, $M^1_{0.95}M^4_{0.02}M^5_{0.03}$, and $M^1_{0.98}M^4_{0.01}M^5_{0.01}$, wherein $M^1$ represents a noble metal, and more preferably, a metal selected from platinum, palladium, gold, rhenium, rhodium, iridium, ruthenium, and osmium; and $M^4$ and $M^5$ each independently represent a first row transition metal, and more preferably, iron, cobalt, nickel, or copper.

Some examples of classes of ternary alloy compositions suitable for the core which contain platinum and two first row transition metals include the platinum-nickel-cobalt, platinum-iron-cobalt, platinum-copper-cobalt, platinum-iron-nickel, platinum-copper-nickel, and platinum-copper-iron compositions.

Some examples of classes of ternary alloy compositions suitable for the core which contain palladium and two first row transition metals include the palladium-nickel-cobalt, palladium-iron-cobalt, palladium-copper-cobalt, palladium-iron-nickel, palladium-copper-nickel, and palladium-copper-iron compositions.

Some examples of classes of ternary alloy compositions suitable for the core which contain rhenium and two first row transition metals include the rhenium-nickel-cobalt, rhenium-iron-cobalt, rhenium-copper-cobalt, rhenium-iron-nickel, rhenium-copper-nickel, and rhenium-copper-iron compositions.

Some examples of classes of ternary alloy compositions suitable for the core which contain gold and two first row transition metals include the gold-nickel-cobalt, gold-iron-cobalt, gold-copper-cobalt, gold-iron-nickel, gold-copper-nickel, and gold-copper-iron compositions.

Some examples of classes of ternary alloy compositions suitable for the core which contain rhodium and two first row transition metals include the rhodium-nickel-cobalt, rhodium-iron-cobalt, rhodium-copper-cobalt, rhodium-iron-nickel, rhodium-copper-nickel, and rhodium-copper-iron compositions.

Some examples of classes of ternary alloy compositions suitable for the core which contain iridium and two first row transition metals include the iridium-nickel-cobalt, iridium-iron-cobalt, iridium-copper-cobalt, iridium-iron-nickel, iridium-copper-nickel, and iridium-copper-iron compositions.

Some examples of classes of ternary alloy compositions suitable for the core which contain ruthenium and two first row transition metals include the ruthenium-nickel-cobalt, ruthenium-iron-cobalt, ruthenium-copper-cobalt, ruthenium-iron-nickel, ruthenium-copper-nickel, and ruthenium-copper-iron compositions.

Some examples of classes of ternary alloy compositions suitable for the core which contain osmium and two first row transition metals include the osmium-nickel-cobalt, osmium-iron-cobalt, osmium-copper-cobalt, osmium-iron-nickel, osmium-copper-nickel, and osmium-copper-iron compositions.

Ternary and higher alloy compositions having at least two noble metals and at least one first row transition metals can be represented by the formula $M^1_x M^2_y M^4_{1-x-y}$, wherein $M^1$ and $M^2$ each independently represent one or a combination of noble metals and $M^4$ represents one or a combination of first row transition metals. The subscripts x and y are any suitable value as described above.

Some examples of ternary alloy compositions suitable for the core which contain two noble metals and one first row transition metal include the rhenium-palladium-$M^4$, rhodium-palladium-$M^4$, iridium-palladium-$M^4$, ruthenium-palladium-$M^4$, osmium-palladium-$M^4$, gold-palladium-$M^4$, rhenium-platinum-$M^4$, rhodium-platinum-$M^4$, iridium-platinum-$M^4$, ruthenium-platinum-$M^4$, gold-platinum-$M^4$, rhodium-rhenium-$M^4$, iridium-rhenium-$M^4$, ruthenium-rhenium-$M^4$, osmium-rhenium-$M^4$, gold-rhenium-$M^4$, iridium-rhodium-$M^4$, ruthenium-rhodium-$M^4$, osmium-rhodium-$M^4$, gold-rhodium-$M^4$, ruthenium-iridium-$M^4$, osmium-iridium-$M^4$, gold-iridium-$M^4$, gold-ruthenium-$M^4$, osmium-ruthenium-$M^4$, and gold-osmium-$M^4$ compositions, wherein $M^4$ represents a first row transition metal, and more preferably, iron, cobalt, nickel, or copper.

Some examples of molar compositions of such ternary alloys include $M^1_{0.01}M^2_{0.01}M^4_{0.98}$, $M^1_{0.02}M^2_{0.03}M^4_{0.95}$, $M^1_{0.05}M^2_{0.05}M^4_{0.9}$, $M^1_{0.1}M^2_{0.1}M^4_{0.8}$, $M^1_{0.2}M^2_{0.1}M^4_{0.7}$, $M^1_{0.2}M^2_{0.2}M^4_{0.6}$, $M^1_{0.1}M^2_{0.3}M^4_{0.6}$, $M^1_{0.2}M^2_{0.3}M^4_{0.5}$, $M^1_{0.3}M^2_{0.3}M^4_{0.4}$, $M^1_{0.1}M^2_{0.5}M^4_{0.4}$, $M^1_{0.2}M^2_{0.4}M^4_{0.4}$, $M^1_{0.4}M^2_{0.3}M^4_{0.3}$, $M^1_{0.1}M^2_{0.6}M^4_{0.3}$, $M^1_{0.2}M^2_{0.5}M^4_{0.3}$, $M^1_{0.4}M^2_{0.4}M^4_{0.2}$, $M^1_{0.5}M^2_{0.3}M^4_{0.2}$, $M^1_{0.1}M^2_{0.7}M^4_{0.2}$, $M^1_{0.4}M^2_{0.5}M^4_{0.1}$, $M^1_{0.3}M^2_{0.6}M^4_{0.1}$, $M^1_{0.1}M^2_{0.8}M^4_{0.1}$, and $M^1_{0.2}M^2_{0.75}M^4_{0.05}$, wherein $M^1$ and $M^2$ each independently represents as noble metal, and $M^4$ represents a first row transition metal.

Some more specific examples of ternary alloy compositions suitable for the core include the approximate molar compositions $Pt_{0.1}Pd_{0.1}X_{0.8}$, $Pt_{0.2}Pd_{0.2}X_{0.6}$, $Pt_{0.4}Pd_{0.4}X_{0.2}$, $Pt_{0.5}Pd_{0.2}X_{0.3}$, $Pt_{0.2}Pd_{0.6}X_{0.2}$, $Re_{0.1}Pd_{0.1}X_{0.8}$, $Re_{0.2}Pd_{0.2}X_{0.6}$, $Re_{0.4}Pd_{0.4}X_{0.2}$, $Re_{0.5}Pd_{0.2}X_{0.3}$, $Re_{0.2}Pd_{0.6}X_{0.2}$, $Rh_{0.1}Pd_{0.1}X_{0.8}$, $Rh_{0.2}Pd_{0.2}X_{0.6}$, $Rh_{0.4}Pd_{0.4}X_{0.2}$, $Rh_{0.5}Pd_{0.2}X_{0.3}$, $Rh_{0.2}Pd_{0.6}X_{0.2}$, $Ir_{0.1}Pd_{0.1}X_{0.8}$, $Ir_{0.2}Pd_{0.2}X_{0.6}$, $Ir_{0.4}Pd_{0.4}X_{0.2}$, $Ir_{0.5}Pd_{0.2}X_{0.3}$, $Ir_{0.2}Pd_{0.6}X_{0.2}$, $Ru_{0.1}Pd_{0.1}X_{0.8}$, $Ru_{0.2}Pd_{0.2}X_{0.6}$, $Ru_{0.4}Pd_{0.4}X_{0.2}$, $Ru_{0.5}Pd_{0.2}X_{0.3}$, $Ru_{0.2}Pd_{0.6}X_{0.2}$, $Au_{0.1}Pd_{0.1}X_{0.8}$, $Au_{0.2}Pd_{0.2}X_{0.6}$, $Au_{0.4}Pd_{0.4}X_{0.2}$, $Au_{0.5}Pd_{0.2}X_{0.3}$, $Au_{0.2}Pd_{0.6}X_{0.2}$, $Re_{0.1}Pt_{0.1}X_{0.8}$, $Re_{0.2}Pt_{0.2}X_{0.6}$, $Re_{0.4}Pt_{0.4}X_{0.2}$, $Re_{0.5}Pt_{0.2}X_{0.3}$, $Re_{0.2}Pt_{0.6}X_{0.2}$, $Rh_{0.1}Pt_{0.1}X_{0.8}$, $Rh_{0.2}Pt_{0.2}X_{0.6}$, $Rh_{0.4}Pt_{0.2}X_{0.2}$, $Rh_{0.5}Pt_{0.2}X_{0.3}$, $Rh_{0.2}Pt_{0.6}X_{0.2}$, $Ir_{0.1}Pt_{0.1}X_{0.8}$, $Ir_{0.2}Pt_{0.2}X_{0.6}$, $Ir_{0.4}Pt_{0.4}X_{0.2}$, $Ir_{0.5}Pt_{0.2}X_{0.3}$, $Ir_{0.2}Pt_{0.6}X_{0.2}$, $Ru_{0.1}Pt_{0.1}X_{0.8}$, $Ru_{0.2}Pt_{0.2}X_{0.6}$, $Ru_{0.4}Pt_{0.4}X_{0.2}$, $Ru_{0.5}Pt_{0.2}X_{0.3}$, $Ru_{0.2}Pt_{0.6}X_{0.2}$, $Au_{0.1}Pt_{0.1}X_{0.8}$, $Au_{0.2}Pt_{0.2}X_{0.6}$, $Au_{0.4}Pt_{0.4}X_{0.2}$, $Au_{0.5}Pt_{0.2}X_{0.3}$, and $Au_{0.2}Pt_{0.6}X_{0.2}$, wherein X represents a first row transition metal, and more preferably, nickel, cobalt, iron, or copper.

Quaternary alloy compositions suitable for the core which contain three noble metals and one first row transition metal can be represented by the formula $M^1_x M^2_y M^3_z M^4_{1-x-y-z}$, wherein $M^1$, $M^2$, and $M^3$ each independently represents a noble metal, and $M^4$ represents a first row transition metal. The subscripts x, y, and z independently represent any suitable value wherein the sum of x, y, and z is less than 1.

Some examples of classes of such quaternary alloys include the gold-iridium-rhenium-nickel, gold-iridium-rhenium-cobalt, gold-iridium-rhenium-iron, iridium-osmium-rhenium-nickel, iridium-osmium-rhenium-cobalt, iridium-osmium-rhenium-iron, gold-ruthenium-rhenium-nickel, gold-ruthenium-rhenium-cobalt, gold-ruthenium-rhenium-iron, gold-iridium-ruthenium-nickel, gold-iridium-ruthenium-cobalt, gold-iridium-ruthenium-iron, gold-rhodium-rhenium-nickel, gold-rhodium-rhenium-cobalt, gold-rhodium-rhenium-iron, gold-rhodium-ruthenium-nickel, gold-rhodium-ruthenium-cobalt, gold-rhodium-ruthenium-iron, rhenium-rhodium-ruthenium-nickel, rhenium-rhodium-ruthenium-cobalt, and rhenium-rhodium-ruthenium-iron compositions.

Quaternary alloy compositions suitable for the core which contain two noble metals and two first row transition metals can be represented by the formula $M^1_x M^2_y M^4_z M^5_{1-x-y-z}$, wherein $M^1$ and $M^2$ each independently represent a noble metal, and $M^4$ and $M^5$ each independently represents a first row transition metal. The subscripts x, y, and z are as described above.

Some examples of classes of such quaternary alloy compositions include the gold-rhenium-nickel-cobalt, gold-rhenium-nickel-iron, gold-rhenium-cobalt-iron, gold-iridium-nickel-cobalt, gold-iridium-nickel-iron, gold-iridium-cobalt-iron, gold-ruthenium-nickel-cobalt, gold-ruthenium-nickel-iron, gold-ruthenium-cobalt-iron, rhenium-ruthenium-nickel-cobalt, rhenium-ruthenium-nickel-iron, rhenium-ruthenium-cobalt-iron, iridium-ruthenium-nickel-cobalt, iridium-ruthenium-nickel-iron, iridium-ruthenium-cobalt-iron, rhodium-ruthenium-nickel-cobalt, rhodium-ruthenium-nickel-iron, and rhodium-ruthenium-cobalt-iron compositions.

Quaternary alloy compositions suitable for the core which contain one noble metal and three first row transition metals can be represented by the formula $M^1_x M^4_y M^5_z M^6_{1-x-y-z}$, wherein $M^1$ represents a noble metal, and $M^4$, $M^5$, and $M^6$ each independently represents a first row transition metal. The subscripts x, y, and z are as described above.

Some examples of such classes of quaternary alloy compositions include the gold-nickel-cobalt-iron, gold-nickel-cobalt-copper, gold-nickel-iron-copper, gold-iron-cobalt-copper, rhenium-nickel-cobalt-iron, rhenium-nickel-cobalt-copper, rhenium-nickel-iron-copper, rhenium-iron-cobalt-copper, iridium-nickel-cobalt-iron, iridium-nickel-cobalt-copper, iridium-nickel-iron-copper, iridium-iron-cobalt-copper, osmium-nickel-cobalt-iron, ruthenium-nickel-cobalt-iron, ruthenium-nickel-cobalt-copper, ruthenium-nickel-iron-copper, ruthenium-iron-cobalt-copper, rhodium-nickel-cobalt-iron, rhodium-nickel-cobalt-copper, rhodium-nickel-iron-copper, and rhodium-iron-cobalt-copper compositions.

An alloy composition of the core can be in a homogeneous form. In a homogeneous form, the metal atoms in such an alloy are distributed uniformly on a molecular level throughout the core. All of the examples given above for alloy compositions include the homogeneous forms thereof.

A homogeneous core can be composed of, for example, two or more noble metals distributed uniformly on a molecular level, e.g., a Pt—Pd, Pt—Re, and Pt—Ru homogeneous alloys. Another example of a homogeneous core is one having one or more metals selected from palladium, platinum, rhodium, iridium, rhenium, osmium, and ruthenium distributed uniformly on a molecular level with one or more metals selected from the first row of transition metals, e.g., manganese, nickel, cobalt, iron, copper, and zinc.

The alloy composition in the core can also be in a heterogeneous form. In a heterogeneous form, the metal atoms in such an alloy core are distributed with varying composition, i.e., non-uniformly, in the core. Such a heterogeneous core can include individual grains, regions, or crystallites composed of one metal intermingled with individual grains, regions, or crystallites of another metal throughout the core. All of the examples given above for alloy compositions include the heterogeneous forms thereof.

Some examples of heterogeneous cores include those containing two or more metals selected from palladium, platinum, rhodium, iridium, rhenium, osmium, and ruthenium, wherein one or more of the metals are not uniformly distributed. For example, a heterogeneous core can have individual grains or crystallites of platinum intermingled with individual grains or crystallites of one or more other metals, particularly other metals selected from palladium, rhodium, iridium, rhenium, osmium, ruthenium, and gold. Or, for example, grains or crystallites of platinum can be intermingled with one or more first row transition metals, e.g., manganese, nickel, cobalt, iron, copper, and zinc.

In a preferred embodiment, a heterogeneous core has an inner subcore (i.e., subcore) at least partially encapsulated by an outer subshell. The outer subshell is covered by the outer shell of gold or gold alloy. The inner subcore and outer subshell are each independently composed of one or a combination of metals suitable for the core.

The outer subshell can be any suitable thickness. In some embodiments, the outer subshell is preferably atomically thin. For example, the outer subshell can be an atomic submonolayer, monolayer, bilayer, trilayer, or any combination thereof.

In one embodiment, such a heterogeneous core includes an inner subcore containing one or a combination of metals selected from palladium, platinum, rhodium, iridium, rhenium, osmium, gold, and ruthenium, and an outer subshell containing one or a combination of metals selected from palladium, platinum, rhodium, iridium, rhenium, osmium, and ruthenium. For example, such a heterogeneous core can include an inner subcore of palladium or ruthenium and an outer subshell of platinum, rhenium, or rhodium. Some other examples of such a heterogeneous core are an inner subcore of Pt—Pd, Pt—Ru, or Pt—Rh encapsulated by an outer subshell of Re, Rh, Ir, Re—Au, Re—Pd, or Re—Pt.

In another embodiment, such a heterogeneous core includes an inner subcore containing one or more non-noble metals; the inner subcore at least partially encapsulated by an outer subshell containing one or more noble metals. The noble metals in the outer subshell are more preferably selected from palladium, platinum, rhodium, iridium, rhenium, osmium, and ruthenium. The non-noble metals of the inner subcore are preferably selected from the first row of transition metals.

For example, the inner subcore can be composed of one or more metals selected from manganese, iron, cobalt, nickel, copper, and zinc, while the outer subshell is composed of one or more metals selected from palladium, platinum, rhodium, iridium, rhenium, osmium, and ruthenium.

The one or more metals in an outer subshell of the core can be in a zerovalent form, a partially oxidized form, or in a completely oxidized form, i.e., as an oxide. The oxidized form can be in the form of a continuous network, or alternatively, individual or aggregated molecular species or complexes of the metals.

The inner subcore-outer shell type of core described above is particularly preferred when the gold-coated particles are subjected to acidic conditions and/or oxidizing potentials. Such conditions are typical for most fuel cells, particularly in the cathodes of fuel cells.

For example, an outer subshell composed of one or more noble metals can protect a subcore composed of one or more reactive metals, e.g., one or more first row transition metals, from a corrosive environment and from oxidation. In so doing, the outer subshell can prevent the reactive metals of the inner subcore from diffusing to the surface and being dissolved. Accordingly, the benefits of a non-noble metal subcore, e.g., cheap replacement of more expensive metals and/or catalytic enhancements, can be realized while not compromising the catalyst.

The heterogeneous metal alloy cores described above can include one or more additional subshells, i.e., one or more intermediate subshells, between an inner subcore and an outer subshell. For example, a nickel, cobalt, iron, or copper subcore can be encapsulated by an intermediate subshell of rhenium; the subshell of rhenium encapsulated by an outer subshell of platinum or palladium. Another example is a nickel, cobalt, iron, or copper subcore encapsulated by a subshell of ruthenium; the subshell of ruthenium encapsulated by an outer subshell of platinum, palladium, or rhenium. In each case, the outer subshell is at least partially encapsulated by the outer shell of gold.

The core can also have a combination of a homogeneous component and a heterogeneous component. For example, the core can include a homogeneous phase of two or more metals in combination with one or more interlayers composed of one or more other metals.

The gold-coated particles described above can have any suitable morphology. For example, the particles can be approximately spherical, oblong, rectangular, tetrahedral, square planar, trigonal bipyramidal, cylindrical, octahedral, cubooctahedral, icosahedral, rhombohedral, rod-shaped, cuboidal, pyramidal, amorphous, and so on.

The gold-coated particles described above can also be in any of several arrangements. The particles can be, for example, agglomerates, micelles, ordered arrays, a guest in a host such as a zeolite or patterned polymer, and so on.

The size of the gold-coated particles is dependent upon the application. For example, in one embodiment, the size of the particles is one or a few nanometers to several hundred nanometers, i.e., nanoparticles. In another embodiment, the size of the particles is in the range of hundreds of nanometers to tens or hundreds of microns, i.e., microparticles.

When the gold-coated particles are directed as oxygen reduction electrocatalysts, as in fuel cells, the particles are preferably nanoparticles. In addition, when used in fuel cells, the size of the nanoparticles can be critical. For example, as the size of the nanoparticles decrease, the electrocatalytic activity of the nanoparticles tends to increase due to an increase in surface area. However, as the size of the particles diminish, the increase in electrocatalytic activity is increasingly counterbalanced by an increase in susceptibility to oxidation.

The gold-coated nanoparticles preferably have a minimum size of about 1 or 2 nanometers, and more preferably, a minimum size of 3, 4 or 5 nanometers. The gold-coated particles preferably have a maximum size of about 500 nanometers, more preferably about 100 nanometers, more preferably about 50 nanometers, and more preferably about 10 nanometers. The maximum size of the gold-coated particles is preferably no more than about 12 nanometers.

The size of the gold-coated particles can be in any suitable range, and more preferably, any suitable range derived from the minimum and maximum values provided above. For example, the size of the particles can be in the range of about 1-3 nm, 1-5 nm, 1-10 nm, 1-12 nm, 1-15 nm, 3-5 nm, 3-10 nm, 3-15 nm, 4-10 nm, 5-10 nm, or 5-15 nm.

The gold-coated particles can be approximately, or precisely, monodisperse in size. For example, the particles can have a monodispersity of 70%, 75%, 80%, 85%, 90%, 95%, 97%, 98%, 99%, 99.5%, 99.8%, or higher. Alternatively, the particles can be anywhere from slightly to widely polydisperse in size.

The gold-coated particles described above can be in any suitable form. For example, the gold-coated particles can be in a solid form, such as a powder.

Alternatively, the gold-coated particles can be suspended or dispersed in a liquid phase. The liquid phase can be any suitable liquid phase. For example, the liquid phase can be aqueous-based. The aqueous-based liquid phase can be completely water, or can include another suitable solvent. For example, the aqueous-based liquid phase can be a water-alcohol mixture.

Alternatively, the liquid phase can be, or include, an organic solvent. Some examples of suitable organic solvents include acetonitrile, dimethylsulfoxide, dimethylformamide, toluene, methylene chloride, chloroform, hexanes, glyme, diethyl ether, and the like.

The gold-coated particles can also have on their surface some trace chemicals. Some examples of trace chemicals include oxides, halogens, carbon monoxide, charged species, and so on, as long as such trace chemicals do not obviate the intended use of the gold-coated particles.

Preferably, when the gold-coated particles are applied in fuel cells, the surfaces of the particles are free of any surface agents including ligands, polymers, surfactants, and so on. However, for other applications, e.g., in catalysis or nanostructural engineering, a surface active agent may be useful. Such surface active agents can be, for example, suitable metal-bonding ligands or surfactants bound to, or associated with, the surface of the particles. Some examples of metal-bonding ligands include phosphines, amines, and thiols.

Some suitable subclasses of phosphine ligands include the trialkylphosphines, triphenylphosphines, diphosphines, and derivatives therefrom. Some specific examples of phosphine ligands include trimethylphosphine, triethylphosphine, triisopropylphosphine, triphenylphosphine, 1,2-bis-(diphenylphosphino)ethane, and derivatives therefrom.

Some suitable subclasses of amine ligands include the nitrogen-containing rings, trialkylamines, and the diamines. Some specific examples of amine ligands include pyridine, 2,2'-bipyridine, terpyridine (2,2';6'2"-terpyridine), piperidine, pyrrole, pyrazole, pyrrolidine, pyrimidine, imidazole, trimethylamine, triethylamine, triisopropylamine, ethylenediamine, and ethylenediaminetetraacetic acid (EDTA).

Some suitable subclasses of thiol ligands include the thiophenols, sulfur-containing rings, alkylmercaptans, sulfides, and disulfides. Some examples of alkylmercaptans include methanethiol, ethanethiol, 2-propanethiol, 2-methyl-2-propanethiol, octylthiol, decylthiol, dodecylthiol, methylsulfide, ethylsulfide, phenyldisulfide, thiophene, 2,2'-bithiophene, and tetrathiafulvalene.

Some examples of surfactants include the polyalkyleneoxides, polyvinylalcohols, polyvinylpyrrolidinones, siloxanes, albumin, sodium dodecyl sulfate, fatty acid salts, derivatives therefrom, and the like. Some more specific examples of classes of polyalkyleneoxide surfactants include polymethyleneoxide, poly(methyleneoxide-ethyleneoxide), polyethyleneoxide, polypropylenenoxide, and poly(ethyleneoxide-propyleneoxide) surfactants.

In another embodiment, the invention relates to a catalyst. The catalyst includes the gold-coated particles thus far described. In one embodiment, the gold-coated particles in the catalyst are bound to a suitable support. The support can be, for example, carbon-based, alumina, silica, silica-alumina, titania, zirconia, calcium carbonate, barium sulphate, a zeolite, interstitial clay, and the like. In another embodiment, the gold-coated particles in the catalyst are not bound to a support.

One class of catalysis reactions for which the gold-coated particles are applicable includes hydrogenation and dehydrogenation reactions of hydrocarbons. Another class of applicable catalysis reactions includes carbon-carbon cross-coupling reactions. Yet another class of applicable catalysis reactions includes hydrosilylation reactions. Particles containing an atomically thin layer, and more preferably, an atomic monolayer of gold or gold alloy, are particularly suitable as catalysts.

In a particularly preferred embodiment, the invention relates to an electrocatalyst. The electrocatalyst includes the gold-coated particles described above bound to an electrically conductive support. In a further embodiment, the electrocatalyst is on a suitable electrode, e.g., an oxygen-reducing cathode.

Preferably, the electrically conductive support is carbon-based. Some examples of carbon-based electrically conductive supports include carbon black, graphitized carbon, graphite, activated carbon, carbon nanotubes, the fullerenes, and the like. The electrically conductive support material is preferably finely divided.

In yet another embodiment, the invention relates to a fuel cell. The fuel cell includes an oxygen-reducing cathode containing the electrocatalyst described above. The electrocatalyst can be incorporated into the oxygen-reducing cathode of a fuel cell by any method known in the art. For example, the electrocatalyst can be incorporated by coating an electrode with the electrocatalyst in a suitable binder and incorporating the coated electrode as an oxygen-reducing cathode in the fuel cell.

In a preferred embodiment, the electrocatalyst is incorporated into the oxygen-reducing cathode by mixing the electrocatalyst with an appropriate amount of Vulcan™ carbon and a fluorinated polymer, such as polytetrafluoroethylene. Any two of the foregoing ingredients can be pre-mixed before mixing with the third ingredient. The resulting mixture is preferably pressed onto a nickel net having a gold overlayer.

The oxygen-reducing cathode is in electrical contact with an anode, i.e., a fuel-oxidizing anode. The anode of the fuel cell can be any of the anodes known in the art. For example, the anode can include supported or unsupported platinum or platinum-alloy compositions. The anode can also include a carbon monoxide-tolerant electrocatalyst. Such carbon monoxide tolerant anodes include numerous platinum alloys. A notable carbon monoxide-tolerant anode containing an atomically thin layer of platinum on ruthenium nanoparticles has been disclosed by Adzic et al. (U.S. Pat. No. 6,670,301 B2). The foregoing patent to Adzic et al. is incorporated herein by reference in its entirety.

The electrocatalyst of the invention can also be incorporated into the anode of a fuel cell. For example, the gold-coated particles can be incorporated in only the anode or in both the cathode and anode of a fuel cell.

The structure of a typical electrode in a fuel cell includes 1) a fluid permeable side with hydrophobic characteristics and 2) a catalytic side having the electrocatalyst. The catalytic side is in direct contact with a liquid or solid electrolyte (e.g., a proton-conducting medium).

The hydrophobic characteristics on the electrode can be provided by one or more substances which are suitably hydrophobic, adhere to the electrode, and do not interfere with the electrochemical process. The hydrophobic substance can also be used as a binder for the supported or unsupported electrocatalyst.

A preferred class of suitable hydrophobic substances is the class of fluorinated polymers. Some examples of particularly preferred fluorinated polymers include polytetrafluoroethylene (PTFE), polytrifluorochloroethylene, and copolymers composed of tetrafluoroethylene and one or more other fluorinated or non-fluorinated monomers. The hydrophobic substance is typically included in an amount of 20 to about 40 percent by weight of the amount of electrocatalyst and/or support.

The electrodes holding the electrocatalyst can be any of various shapes, including tubular, rod-like, or planar. In order to maximize the area-to-volume ratio of the electrode, the electrodes are preferably in the form of thin sheets.

In the fuel cell, an ion-conducting electrolyte is in mutual contact with the cathode and anode. The ion-conducting electrolyte conducts either protons or reduced oxygen species from one electrode to the other while separating the fuel at the anode from the oxidant at the cathode. The ion-conducting electrolyte can be a liquid, solid, or semi-solid.

Preferably, the ion-conducting electrolyte is proton-conducting, i.e., selectively conducts protons from the anode to the cathode. Such a proton-conducting electrolyte is more preferably a solid or semi-solid proton-conducting membrane.

A preferred class of proton-conducting polymer electrolytes are the commercially available copolymers of tetrafluoroethylene and perfluorinated vinyl ethers marketed by E. I. duPont de Nemours and Co under the trade name NAFION®.

Such membrane-like materials are derivatized with acidic groups, such as sulfonic, carboxylic, phosphinic, or boric acid groups.

The fully assembled fuel cell can have stack designs to increase the electrical output. For example, any of the known stack configurations designed for compactness and efficient supply of fuels to the anode and oxygen to the cathode can be used.

In another embodiment, the invention relates to a method for reducing oxygen gas. In one embodiment, the method uses the gold-coated particles described above on a suitable electrode to reduce oxygen gas. When reducing oxygen, the gold-coated particles can be in the form of, for example, an unsupported powdery or granular solid, or alternatively, an unsupported dispersion or suspension in a liquid phase. The particles can be bound to a support when reducing oxygen gas.

In another embodiment, the invention relates to a method for producing electrical energy from the fuel cell described above. The fuel cell, as described, becomes operational and produces electrical energy when the oxygen-reducing cathode is contacted with an oxidant, such as oxygen, and the fuel-oxidizing anode is contacted with a fuel source.

Oxygen gas can be supplied to the oxygen-reducing cathode in the form of pure oxygen gas. Pure oxygen gas is particularly preferable for use in alkaline fuel cells.

In the case of acid electrolyte fuel cells, the oxygen gas is more preferably supplied as air. Alternatively, oxygen gas can be supplied as a mixture of oxygen and one or more other inert gases. For example, oxygen can be supplied as oxygen-argon or oxygen-nitrogen mixtures.

Some contemplated fuel sources include, for example, hydrogen gas, alcohols, methane, gasoline, formic acid, dimethyl ether, and ethylene glycol. Some examples of suitable alcohols include methanol and ethanol. For alkaline fuel cells, the hydrogen gas is preferably very pure, and accordingly, free of contaminants such as carbon dioxide which degrade the strongly alkaline electrolyte.

The fuels can be unreformed, i.e., oxidized directly by the anode. Alternatively, the fuels can be used indirectly, i.e., treated by a reformation process to produce hydrogen. For example, hydrogen gas can be generated and supplied to the anode by reforming methanol, methane, or gasoline.

The gold-coated particles can be produced by any suitable method. Some methods known in the art for synthesizing such particles include reductive chemical methods, chemical vapor deposition (CVD), thermal decomposition, physical vapor deposition (PVD), reactive sputtering, electrodeposition, laser pyrolysis, and sol gel techniques.

In solution, gold can be deposited onto suspended metal substrate particles by a spontaneous redox displacement process. For example, a suitable gold salt will spontaneously deposit gold onto substrate particles coated with metals of lower reduction potential than gold.

For example, in one embodiment, a gold salt is contacted with noble metal cores coated with a metal of low reduction potential (e.g., one or a combination of the first row transition metals). On contact with the gold salt, an atomically thin gold layer is deposited onto the substrate particles by redox displacement by gold of the metal of low reduction potential.

The foregoing redox displacement process is analogous to a reported process for the deposition of a layer of platinum on palladium particles. See, for example, J. Zhang, et al., "Platinum Monolayer Electrocatalysts For $O_2$ Reduction: Pt Monolayer On Pd(111) And On Carbon-Supported Pd Nanoparticles", *J. Phys. Chem. B.*, 108: 10955 (2004). The latter reference is incorporated herein by reference in its entirety.

In accordance with the method of Zhang et al. noted above, a gold-coated particle can be produced by first, electrodepositing an atomic monolayer of a metal of lower reduction potential than gold (i.e., an underpotentially deposited metal) onto a suitable metal core. The metal of lower reduction potential can be, for example, one of the first row transition metals, such as copper. The electrodeposition of copper is followed by contact with a gold salt to initiate a spontaneous redox displacement of the copper monolayer by gold.

The redox displacement reaction can be practiced by, for example, immersing copper-coated particles into a solution containing a gold salt. Some examples of suitable gold salts for this purpose include $HAuCl_4$, $NaAuCl_4$, $KAuCl_4$, and $KAu(CN)_2$.

A gold alloy layer can also be deposited onto suitable cores by contacting copper-coated cores with one or more gold salts and one or more noble metal salts of a noble metal other than gold. The relative amount of each metal in the resulting outer shell or outer subshell corresponds to, and is determined by, the relative molar amount of each metal salt used in the process.

For example, an outer shell of rhenium-gold alloy can be deposited by contacting a copper-coated metal core with a mixture of $HAuCl_4$ and $ReCl_3$. The amount of gold to rhenium in the resulting outer shell corresponds to the molar amount of gold salt to rhenium salt used in the process.

The electrodeposition displacement process described above can also be used for depositing one or more non-gold layers. Such non-gold layers may serve, for example, as a core outer or intermediate subshell. For example, a subshell of iridium, ruthenium, osmium, or rhenium can be deposited by contacting a copper-coated metal core with the corresponding metal salt, e.g., $IrCl_3$, $RuCl_3$, $OsCl_3$, $ReCl_3$, respectively. Alloys of these metals can be deposited by contacting the copper-coated metal core with an appropriate combination of the corresponding metal salts.

Gold and other noble metals can also be deposited onto metal cores by chemically reductive (i.e., electroless) means. For example, in solution, gold and other noble metals can be deposited onto substrate particles in the presence of a reducing agent, such as, for example, sodium borohydride, citric acid, hypophosphorous acid, ascorbic acid, hydroxylamine, or hydrazine.

Alternatively, gold can be deposited onto suitable metal cores by contacting a gold-containing vapor or plasma with substrate particles. During contact, the gold vapor or plasma will deposit an outer shell of gold onto the substrate particles.

Chemical reductive methods can also be used to synthesize the cores. For example, chemical reductive methods can be used to make particle cores of palladium, rhodium, iridium, ruthenium, osmium, rhenium, nickel, cobalt, iron, and combinations thereof.

The metal cores can also be prepared by vapor phase methods. For example, a vapor or plasma containing platinum or palladium can be allowed to condense to form nanoparticles of these metals.

Examples have been set forth below for the purpose of illustration and to describe the best mode of the invention at the present time. However, the scope of this invention is not to be in any way limited by the examples set forth herein.

EXAMPLE 1

Preparation of Gold-Coated Platinum Nanoparticles

Gold-coated platinum nanoparticles (also denoted as Au/Pt) were prepared by depositing an atomic monolayer of gold onto platinum nanoparticles. The gold was deposited using the redox displacement method described by Zhang et al. (Ibid.).

In the process, a monolayer of copper (copper adlayer) was deposited onto platinum nanoparticles of circa 3-10 nm diameter by placing the nanoparticles on a suitable electrode and applying a suitable reducing potential to the electrode immersed in a ~50 mM $CuSO_4$/010M $H_2SO_4$ aqueous solution in a nitrogen atmosphere. The electrode with copper-coated Pt nanoparticles was rinsed with purified water to remove copper (2+) ions in solution. To displace the copper monolayer with a gold monolayer, the electrode with Pt nanoparticles was then immersed in a ~1.0 mM aqueous solution of a suitable gold salt (e.g., $HAuCl_4$). After a 1-2 minute immersion to completely replace copper by gold, the electrode was rinsed again.

To prepare the electrode with Pt nanoparticles, a dispersion of Pt nanoparticles on carbon substrate (Pt/C) was made by sonicating the nanoparticles in water for, about 5-10 minutes to make a uniform suspension. The carbon substrate used was Vulcan XC-72. Then, 5 microliters of this suspension was placed on a glassy carbon disk (GC) electrode and dried in air.

All of these operations were carried out in a multi-compartment cell in a nitrogen atmosphere that prevents the oxidation of Cu adatoms in contact with $O_2$.

EXAMPLE 2

Electrocatalytic Activity Measurements of Gold Monolayer-Coated Platinum Nanoparticles Platinum dissolution from platinum electrocatalyst nanoparticles on oxygen-reducing cathodes can be prevented by placing a submonolayer-to-monolayer of gold onto the platinum nanoparticles. Since gold is oxidized at considerably more positive potentials than platinum (0.75 V for Pt vs. 1.3 V for Au), it is believed that the gold-coated platinum electrocatalyst has a positively shifted platinum oxidation. Such a positively shifted platinum oxidation would account for the increase in stability observed for the gold-coated platinum electrocatalyst.

In addition to the noted stability, surprisingly, the oxygen reduction of platinum covered by a submonolayer-to-monolayer of gold occurs with almost identical kinetics for platinum. Accordingly, the electrocatalytic activity of platinum in these gold-coated electrocatalysts remains intact and is not compromised by the gold coating. A similar result was found with a Pt(111) surface covered by a submonolayer of gold.

Figure 2:
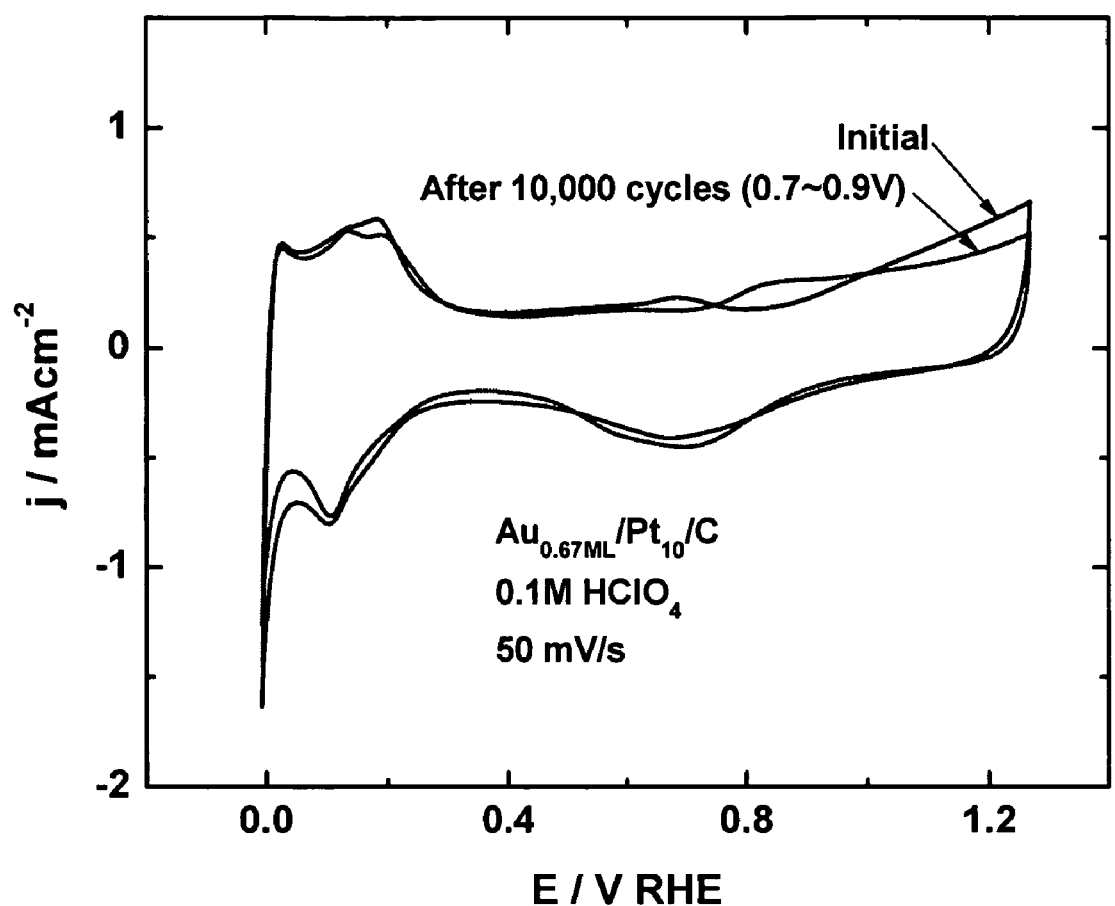
FIG. 2. Comparison of the oxidation of gold-coated platinum particle electrocatalysts on carbon ($Au_{ML}$/Pt/C where ML=monolayer) before and after 10,000 cycles from 0.7 to 0.9 volts at a sweep rate of 10 mV/s.

The stability of these gold-coated electrocatalysts was verified by subjecting electrocatalyst nanoparticles to cycling potentials between 0.7 volts and 0.9 volts during oxygen reduction. FIG. 1 shows the activity of the Au/Pt/C electrocatalyst before and after 10,000 potential cycles (sweep of 100 mV/s). FIG. 2 shows voltammetry curves obtained before and after 10,000 potential cycles (sweep rate of 10 mV/s).

As shown by the figures, the change in activity before and after the cycles is negligible. In particular, FIG. 1 shows that less than a 5 mV change in a half-wave potential after 10,000 potential cycles. FIG. 2 show a negligible change in the oxide formation after the cycles, also indicating the stability of the electrocatalyst.

A test of 30,000 cycles with potential cycling from 0.6 V to 1.0 V was also performed on these gold-coated electrocatalysts. The results of the test also showed a negligible loss in electrocatalytic activity of the gold-coated electrocatalysts.

At very high potentials, a signature peak is observed for the oxidation of gold to gold oxide (circa 1.17V). In contrast, the conversion of platinum to its corresponding oxide is known to occur at around 0.65V. Accordingly, the ~1.17V signature peak confirms the presence of gold on the platinum surface.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. An oxygen-reducing electrocatalyst comprised of gold-coated metal particles bound to an electrically conductive support, said gold-coated metal particles comprising a noble metal-containing core at least partially encapsulated by an atomically thin outer shell of a gold alloy.

2. The oxygen-reducing electrocatalyst according to claim 1, wherein said atomically thin outer shell of gold alloy is an atomic submonolayer, monolayer, bilayer, or multilayer formed on the noble metal-containing core surface.

3. The oxygen-reducing electrocatalyst according to claim 1, wherein said outer shell is comprised of gold in the presence of one or more alloying metals.

4. The oxygen-reducing electrocatalyst according to claim 1, wherein said outer shell is comprised of an atomic submonolayer of gold in combination with a submonolayer of one or a combination of metals other than gold, thereby providing a gold alloy atomic monolayer.

5. The oxygen-reducing electrocatalyst according to claim 4, wherein said one or combination of metals other than gold are selected from the class of transition metals.

6. The oxygen-reducing electrocatalyst according to claim 5, wherein said transition metals are selected from the group consisting of palladium, platinum, rhenium, rhodium, iridium, ruthenium, osmium, and combinations thereof.

7. The oxygen-reducing electrocatalyst according to claim 1, wherein said noble metal-containing core is comprised of a metal selected from the group consisting of platinum, palladium, rhodium, iridium, rhenium, osmium, and ruthenium.

8. The oxygen-reducing electrocatalyst according to claim 7, wherein said noble metal-containing core is comprised of platinum.

9. The oxygen-reducing electro catalyst according to claim 1, wherein said noble metal-containing core has a homogeneous composition comprised of two or more metals selected from the group consisting of platinum, palladium, rhodium, iridium, rhenium, osmium, gold, and ruthenium.

10. The oxygen-reducing electrocatalyst according to claim 9, wherein said noble metal-containing core is comprised of platinum and palladium.

11. The oxygen-reducing electrocatalyst according to claim 1, wherein said noble metal-containing core has a heterogeneous composition comprised of two or more metals selected from the group consisting of platinum, palladium, rhodium, iridium, rhenium, osmium, gold, and ruthenium.

12. The oxygen-reducing electrocatalyst according to claim 11, wherein said noble metal-containing core is comprised of platinum in combination with one or more metals selected from the group consisting of palladium, rhodium, iridium, rhenium, osmium, gold, and ruthenium.

13. The oxygen-reducing electro catalyst according to claim 12, wherein said noble metal-containing core is comprised of platinum and palladium.

14. The oxygen-reducing electrocatalyst according to claim 13, wherein said noble metal-containing core is comprised of an inner subcore comprising palladium, said inner subcore at least partially encapsulated by an outer subshell of platinum.

15. The oxygen-reducing electrocatalyst according to claim 14, wherein said outer subshell of platinum is atomically thin.

16. The oxygen-reducing electro catalyst according to claim 1, wherein said noble metal-containing core has a homogeneous composition comprised of one or more metals selected from the group consisting of platinum, palladium, rhodium, iridium, rhenium, osmium, ruthenium, and gold, in combination with one or more metals selected from the group consisting of first row transition metals.

17. The oxygen-reducing electrocatalyst according to claim 1, wherein said noble metal-containing core has a heterogeneous composition comprised of one or more metals selected from the group consisting of platinum, palladium, rhodium, iridium, rhenium, osmium, ruthenium, and gold, in combination with one or more metals selected from the group consisting of first row transition metals.

18. The oxygen-reducing electrocatalyst according to claim 17, wherein said noble metal-containing core is comprised of an inner subcore comprised of one or more metals selected from the group consisting of first row transition metals, said inner subcore at least partially encapsulated by an outer subshell comprised of one or more metals selected from the group consisting of platinum, palladium, rhodium, iridium, rhenium, osmium, and ruthenium.

19. The oxygen-reducing electrocatalyst according to claim 18, wherein said first row transition metals are selected from iron, cobalt, and nickel.

20. The oxygen-reducing electrocatalyst according to claim 18, wherein said inner subcore is comprised of one or more metals selected from iron, cobalt, and nickel, and said outer subshell is comprised of platinum.

21. The oxygen-reducing electrocatalyst according to claim 1, wherein the gold-coated metal particles have a size of approximately one nanometer to one hundred nanometers.

22. The oxygen-reducing electrocatalyst according to claim 21, wherein the gold-coated metal particles have a size of about three to ten nanometers.

23. An oxygen-reducing electrocatalyst comprised of gold-coated platinum nanoparticles bound to an electrically conductive support, said nanoparticles comprising a platinum or platinum alloy core at least partially encapsulated by an atomically thin outer shell of a gold alloy.

24. An electrocatalyst comprised of gold-coated metal particles bound to an electrically conductive support, said gold-coated metal particles comprising a core containing at least one noble metal selected from the group consisting of rhodium, iridium, rhenium, osmium, and ruthenium which is at least partially encapsulated by an atomically thin outer shell of gold alloy.

25. The electrocatalyst according to claim 24, wherein said atomically thin outer shell has an atomic submonolayer, monolayer, bilayer, or multilayer coverage of the core surface.

26. The electrocatalyst according to claim 24, wherein said outer shell is comprised of gold in the presence of one or more alloying metals.

27. The electrocatalyst according to claim 24, wherein said outer shell is comprised of an atomic submonolayer of gold alloy.

28. The electrocatalyst according to claim 26, wherein said one or more alloying metals are selected from the class of transition metals.

29. The electrocatalyst according to claim 28, wherein said transition metals are selected from the group consisting of palladium, platinum, rhenium, rhodium, iridium, ruthenium, osmium, and combinations thereof.

30. The electrocatalyst according to claim 24, wherein said core has a homogeneous composition comprised of two or more noble metals selected from the group consisting of platinum, rhodium, iridium, rhenium, osmium, and ruthenium.

31. The electrocatalyst according to claim 24, wherein said core has a homogeneous composition comprised of two or more noble metals selected from the group consisting of palladium, rhodium, iridium, rhenium, osmium, and ruthenium.

32. The electrocatalyst according to claim 24, wherein said core has a homogeneous composition comprised of two or more noble metals selected from the group consisting of rhodium, iridium, rhenium, osmium, gold, and ruthenium.

33. The electrocatalyst according to claim 24, wherein said core has a heterogeneous composition comprised of two or more noble metals selected from the group consisting of platinum, rhodium, iridium, rhenium, osmium, and ruthenium.

34. The electrocatalyst according to claim 24, wherein said core has a heterogeneous composition comprised of two or more noble metals selected from the group consisting of palladium, rhodium, iridium, rhenium, osmium, and ruthenium.

35. The electrocatalyst according to claim 24, wherein said core has a heterogeneous composition comprised of two or more noble metals selected from the group consisting of rhodium, iridium, rhenium, osmium, gold, and ruthenium.

36. The electrocatalyst according to claim 24, wherein said noble metal-containing core has a homogeneous composition comprised of one or more metals selected from the group consisting of rhodium, iridium, rhenium, osmium, and ruthenium in combination with one or more metals selected from the group consisting of first row transition metals.

37. The electrocatalyst according to claim 24, wherein said noble metal-containing core has a heterogeneous composition comprised of one or more metals selected from the group consisting of rhodium, iridium, rhenium, osmium, and ruthenium in combination with one or more metals selected from the group consisting of first row transition metals.

38. The electrocatalyst according to claim 37, wherein said noble metal-containing core is comprised of an inner subcore comprised of one or more metals selected from the group consisting of first row transition metals, said inner subcore at least partially encapsulated by an outer subshell comprised of one or more metals selected from the group consisting of rhodium, iridium, rhenium, osmium, and ruthenium.

39. The electrocatalyst according to claim 38, wherein said first row transition metals are selected from iron, cobalt, and nickel.

40. The electrocatalyst according to claim 24, wherein the gold-coated metal particles have a size of approximately one nanometer to one hundred nanometers.

41. The electrocatalyst according to claim 40, wherein the gold-coated metal particles have a size of about three to ten nanometers.

42. A method of catalyzing an oxidation reduction reaction comprising:
exposing an oxidant to an electrode comprised of an electrically conductive support bound to gold-coated metal particles comprising a noble metal-containing core at least partially encapsulated by atomically thin gold islands.

43. An electrocatalyst comprised of metal particles bound to an electrically conductive support, said metal particles comprising a noble metal-containing core with an outer surface at least partially encapsulated by atomically thin gold islands.

44. The electrocatalyst according to claim 43, wherein the thickness of the atomically thin gold islands is equal to a bilayer or trilayer of gold atoms.

45. The electrocatalyst according to claim 43, wherein the noble metal-containing core comprises platinum.

46. The electrocatalyst according to claim 43, wherein the noble metal-containing core is homogeneous.

47. The electrocatalyst according to claim 43, wherein the noble metal-containing core is heterogeneous.

* * * * *